(12) United States Patent
Shigematsu et al.

(10) Patent No.: US 11,758,261 B2
(45) Date of Patent: Sep. 12, 2023

(54) IMAGE PICKUP APPARATUS AND ELECTRONIC DEVICE HAVING OPTICAL INPUT DEVICE

(71) Applicant: CANON KABUSHIKI KAISHA, Tokyo (JP)

(72) Inventors: Masayasu Shigematsu, Tokyo (JP); Yohei Sato, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 242 days.

(21) Appl. No.: 17/243,105

(22) Filed: Apr. 28, 2021

(65) Prior Publication Data

US 2021/0250491 A1 Aug. 12, 2021

Related U.S. Application Data

(63) Continuation of application No. PCT/JP2019/042811, filed on Oct. 31, 2019.

(30) Foreign Application Priority Data

Nov. 8, 2018 (JP) .................................. 2018-210649
Apr. 24, 2019 (JP) .................................. 2019-083093
(Continued)

(51) Int. Cl.
*H04N 23/62* (2023.01)
*G06F 3/0354* (2013.01)
(Continued)

(52) U.S. Cl.
CPC ......... *H04N 23/62* (2023.01); *G06F 3/03547* (2013.01); *H04N 23/55* (2023.01);
(Continued)

(58) Field of Classification Search
CPC ...... H04N 23/62; H04N 23/55; H04N 23/632; H04N 23/635; H04N 23/675; H04N 23/51;
(Continued)

(56) References Cited

U.S. PATENT DOCUMENTS

2002/0030668 A1* 3/2002 Hoshino ............... G06F 3/0338
345/175
2002/0155857 A1* 10/2002 Nishimoto .......... G06F 3/03547
455/566

(Continued)

FOREIGN PATENT DOCUMENTS

CN 101262561 A 9/2008
EP 2328066 A1 6/2011
(Continued)

OTHER PUBLICATIONS

International Search Report of PCT/JP2019/042811 dated Dec. 10, 2019.
(Continued)

*Primary Examiner* — Sinh Tran
*Assistant Examiner* — Zhenzhen Wu
(74) *Attorney, Agent, or Firm* — Cowan, Liebowitz & Latman, P.C.

(57) ABSTRACT

The immediacy is not reduced, and autofocus is not started while the focus position being selected. The image pickup apparatus includes an operation member that selects a position for performing autofocus using a light input device that detects the movement of the finger and instructs the start of autofocus by an operation by the finger. When autofocus being performed, a display object for selecting a position for performing autofocus is displayed on the display unit 28 and the viewfinder in-field display unit 41. The system control unit 50 moves the display object according to the movement (Continued)

amount of the finger detected by the light input device, and starts autofocus at the position of the display object when the operation member is operated. The light input device is disposed below the face, of the operation member, on which the finger is placed.

7 Claims, 18 Drawing Sheets

(30) Foreign Application Priority Data

| | | |
|---|---|---|
| Apr. 25, 2019 | (JP) | 2019-084017 |
| Jun. 28, 2019 | (JP) | 2019-121812 |

(51) Int. Cl.
*H04N 23/55* (2023.01)
*H04N 23/63* (2023.01)
*H04N 23/67* (2023.01)

(52) U.S. Cl.
CPC ......... *H04N 23/632* (2023.01); *H04N 23/635* (2023.01); *H04N 23/675* (2023.01)

(58) Field of Classification Search
CPC .. H04N 23/53; H04N 23/663; G06F 3/03547; G06F 3/0425; G03B 17/14; G03B 13/36; G03B 3/10; G03B 17/18; G03B 17/20; G02B 7/34; G02B 7/36
See application file for complete search history.

(56) References Cited

U.S. PATENT DOCUMENTS

| | | |
|---|---|---|
| 2003/0006367 A1 | 1/2003 | Liess et al. |
| 2006/0082549 A1 | 4/2006 | Hoshino et al. |
| 2007/0269197 A1 | 11/2007 | Ide et al. |
| 2008/0240694 A1* | 10/2008 | Okazaki ................. G03B 17/18 396/50 |
| 2009/0167681 A1* | 7/2009 | Motoe ..................... G06F 3/042 345/157 |
| 2014/0098273 A1* | 4/2014 | Ito ........................... H04N 23/62 348/333.03 |
| 2015/0189162 A1 | 7/2015 | Kuo et al. |
| 2016/0216492 A1* | 7/2016 | Yun ..................... G02B 13/0075 |
| 2017/0195552 A1 | 7/2017 | Saito |
| 2019/0041726 A1 | 2/2019 | Nishimura |
| 2020/0336651 A1* | 10/2020 | Misawa ................. H04N 23/00 |

FOREIGN PATENT DOCUMENTS

| | | |
|---|---|---|
| JP | 04-335623 A | 11/1992 |
| JP | 09-138452 A | 5/1997 |
| JP | 10-68992 A | 3/1998 |
| JP | 2003-125251 A | 4/2003 |
| JP | 2006-195706 A | 7/2006 |
| JP | 2006195706 A * | 7/2006 |
| JP | 2006-319903 A | 11/2006 |
| JP | 4374049 B2 | 12/2009 |
| JP | 2011-044838 A | 3/2011 |
| JP | 2011-170754 A | 9/2011 |
| WO | 2017/130698 A1 | 8/2017 |

OTHER PUBLICATIONS

Nov. 19, 2021 Chinese Office Action, which is enclosed with an English Translation, that issued in Chinese Patent Application No. 201980073671.1.

Nov. 23, 2022 European Search Report , that issued in European Application No. 19 882 450.0.

European Search Report dated Jul. 4, 2022, that issued in the corresponding European Patent Application No. 19882450.0.

Jun. 6, 2023 Japanese Office Action, which is enclosed thout an English Translation, that issued in Japanese Patent Application No. 2019-084017.

* cited by examiner

IMAGE PICKUP APPARATUS AND ELECTRONIC DEVICE HAVING OPTICAL INPUT DEVICE

CROSS-REFERENCE TO RELATED APPLICATIONS

This application is a Continuation of International Patent Application No. PCT/JP2019/042811, filed on Oct. 31, 2019, which claim the benefit of Japanese Patent Application No. 2018-210649, filed on Nov. 8, 2018, Japanese Patent Application No. 2019-083093, filed on Apr. 24, 2019, Japanese Patent Application No. 2019-084017, filed on Apr. 25, 2019, and Japanese Patent Application No. 2019-121812, filed on Jun. 28, 2019, all of which are hereby incorporated by reference herein in their entirety.

BACKGROUND OF THE INVENTION

Field of the Invention

The present invention relates to an image pickup apparatus such as a digital camera, and more particularly to an image pickup apparatus capable of improving operability from selection of a focus position for autofocus to start of autofocus. The present invention also relates to an electronic device such as a digital camera, and more particularly to an electronic device including an optical input device that detects the movement of a contact object such as a finger in contact with a detection face.

Background Art

Generally, an image pickup apparatus such as a digital camera includes an operation unit for starting autofocus. Moreover, some image pickup apparatuses are designed to display a plurality of autofocusable positions with a cursor or the like, and move the position of the cursor by an operation member such as a joystick or a dial.

In recent years, in the image pickup apparatus, the range in which autofocus is possible has been widened and as a result, the number of points (positions) at which autofocus can be selected tends to increase. As a result, the user can perform shooting with a freer composition.

On the other hand, in an operation of conventional technique with an operation member such as a joystick or a dial, the cursor cannot be moved to the target focus position unless the number of times the operation for moving the cursor is performed is increased. For this reason, the immediacy with respect to the movement of the cursor is reduced.

In order to prevent a decrease in immediacy, for example, there is an image pickup apparatus in which a position at which autofocus is possible is selected by using a touch pad provided on a liquid crystal disposed on the rear face thereof. When the touch pad is used, the cursor can be moved and the focus position can be selected according to the amount of finger movement, so that the immediacy of the cursor movement is not reduced.

However, in the conventional image pickup apparatus, after selecting the position where autofocus is possible with the operation member (for example, a touch pad), it is necessary to perform an operation to start autofocus by another operation member. Therefore, it is necessary to move the finger from the selection of the autofocus position to the start of the autofocus, and it may take time to start the autofocus. As a result, the user may miss a photo opportunity.

In order to deal with such a problem, for example, there is an image pickup apparatus in which operation in a two-dimensional direction and determination of a focus position are performed without a user taking a finger off the touch pad (Patent Literature 1). Then, in Patent Literature 1, an operation in the XY direction and an operation in the pushing direction are detected by using a capacitance type sensor.

On the other hand, as an electronic device including an optical input device that detects the movement of a contact object such as a finger that has come into contact with the detection face, Patent Literature 2 discloses a tablet computer having a finger guide face that is recessed from the appearance surface of the housing, and an optical tracking pointer as an optical input device having a detection face (contact surface) provided in succession with the finger guide face. Since the detection face to which the finger contacts so that the fingerprint is read is recessed from the appearance surface, the detection face is less likely to be scratched.

Patent Literature 1: Japanese Laid-Open Patent Publication (Kokai) No. H10-68992
Patent Literature 2: Japanese Patent No. 4374049

Since the method described in Patent Literature 1 uses a capacitance type sensor, it is difficult to increase the stroke in the pushing direction. As a result, there is a possibility that a slight push may be detected when operating in the two-dimensional direction. That is, by the method of Patent Literature 1, there is a high possibility that the autofocus will be started at a position not intended by the user by erroneously detecting the push-in while selecting the focus position.

In the optical input device disclosed in Patent Literature 2, since the contact surface is formed so as to be more convex than the finger guide face around the contact surface, this structure may be a resistance that deteriorates the finger slippage. For this reason, the contact surface may be formed in a concave shape in succession with the finger guide face, but in this structure, fine dust tends to collect in the center portion (the most recessed part) of the contact surface, and accumulated dust can interfere with fingerprint detection.

SUMMARY OF THE INVENTION

The present invention provides an image pickup apparatus that does not reduce the immediacy of cursor movement and does not start autofocus while a focus position been selected. The present invention also provides an electronic device including an optical input device of which detection face is not easily scratched and is not easily affected by dust.

To achieve the above object, an image pickup apparatus according to the present invention is an image pickup apparatus in which a position in a shooting screen at which autofocus is performed is selected, a start of the autofocus at the selected position is instructed, and picking up is performed, the image pickup apparatus comprising an operation member configured to select a position in the shooting screen at which the autofocus is performed using a light input device that detects a slide movement of a finger, and instruct a start of the autofocus by an operation by the finger, a display unit configured to display a display object, for selecting a position in a shooting screen at which the autofocus is performed when the autofocus is performed, and a controller configured to move the display object according to an amount of movement of the finger detected by the light input device and start the autofocus at the position of the display object when the operation member is operated, wherein the light input device is disposed below a face, of the operation member, on which a finger is placed.

To achieve the above object, an electronic device of the present invention is an electronic device having an optical input device, wherein the optical input device comprising a detection face, a light source configured to emit illumination light that is transmitted through the detection face, and illuminates a contact object in contact with the detection face, an optical member having an imaging optical unit that images reflected light, of the illumination light, reflected by the contact object to be transmitted through the detection face, and a light receiving sensor configured to photoelectrically convert an optical image of the contact object formed by the reflected light, wherein the detection face has a concave curved face shape that is recessed from a peripheral portion surrounding the detection face of an exterior face of the electronic device, and wherein an optical axis position of the imaging optical unit deviates from a center position or a most recessed position of the detection face.

Further features of the present invention will become apparent from the following description of exemplary embodiments (with reference to the attached drawings).

DESCRIPTION OF THE EMBODIMENTS

An example of an image pickup apparatus according to the embodiment of the present invention will be described below with reference to the drawings.

Figure 1A:
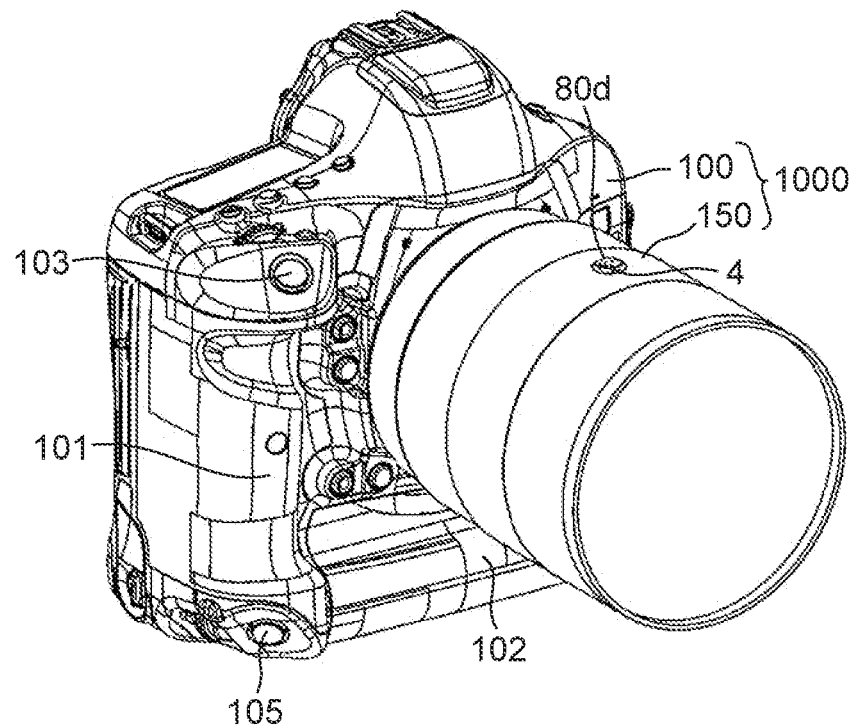
FIG. 1A is a perspective view showing the appearance of an example of an image pickup apparatus (camera system) according to an embodiment of the present invention.
Figure 1B:
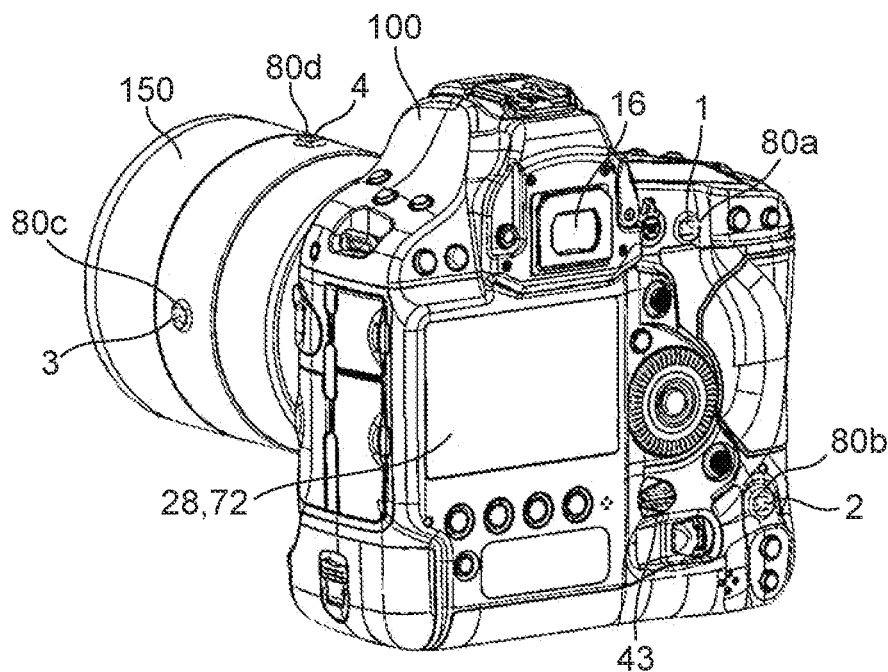
FIG. 1B is a perspective view showing the appearance of an example of the image pickup apparatus (camera system) according to the embodiment of the present invention.

FIGS. 1A and 1B are perspective views showing the appearance of an example of an image pickup apparatus according to an embodiment of the present invention. FIG. 1A is a perspective view of the image pickup apparatus viewed from the front (front side), and FIG. 1B is a perspective view of the image pickup apparatus viewed from the back.

The image pickup apparatus shown is a digital single-lens reflex camera (hereinafter referred to as a camera) 1000 (also referred to as a camera system 1000), and includes a camera body 100 and a lens unit 150 (also referred to as an interchangeable lens unit 150) on which a taking lens is mounted and that is detachable from the camera body 100.

More specifically, FIGS. 1A and 1B show the appearance of the interchangeable lens digital camera system 1000 as viewed from the front and the back respectively. The digital camera system 1000 includes a camera body 100 and an interchangeable lens unit 150, which are electronic devices. The interchangeable lens unit 150 holds an image pickup lens.

In FIG. 1A, the camera body 100 includes a first grip portion 101 projecting forward. With the first grip portion 101, the user can stably grip and operate the camera body 100 when performing shooting with the camera 1000 in the normal position posture (posture in which a substantially rectangular pickup region in an image pickup unit 22 described later is set to be longer in the horizontal direction than in the vertical direction). Further, the camera body 100 includes a second grip portion 102 projecting forward. With the second grip portion 102, the user can stably grip and operate the camera body 100 when performing shooting with the camera 1000 in the upright position posture (posture in which a substantially rectangular pickup region in an image pickup unit 22 is set to be longer in the vertical direction than in the horizontal direction).

It should be noted that the second grip portion 102 may be integrally formed with the camera body 100, or may be detachable from the camera body 100.

Figure 5A:
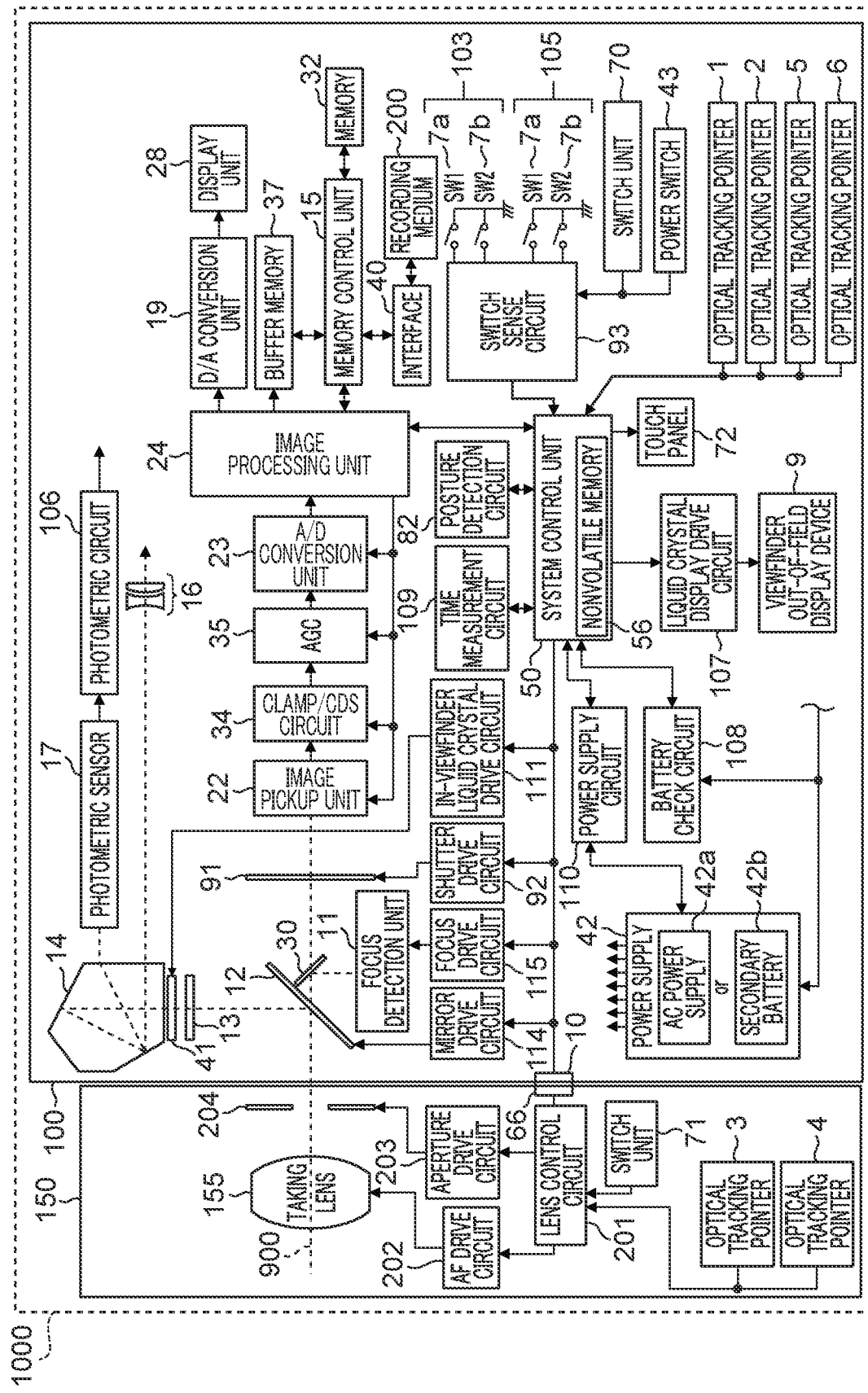
FIG. 5A is a block diagram showing an example of the configuration of the camera shown in FIGS. 1A and 1B.

Each of the shutter buttons 103 and 105 is operated when instructing the start of shooting. These shutter buttons 103 and 105 are included in a switch unit 70 (FIG. 5A). When each of the shutter buttons 103 and 105 is pressed halfway (first stroke), the switch SW1 is turned on and a first shutter switch signal SW1 is generated. In response to the first shutter switch signal SW1, operations such as an AF (autofocus) process, an AE (automatic exposure) process, an AWB (auto white balance) process, and an EF (flash pre-flash) process are started as will be described later. The AF process can be cancelled by releasing the first stroke.

When each of the shutter buttons 103 and 105 is fully pressed (second stroke), the switch SW2 is turned on and a second shutter switch signal SW2 is generated. As a result, a series of shooting processes from reading the signal of an image pickup unit 22 (also referred to as an image pickup device 22) to writing image data to a recording medium 200 is started.

The shown camera 1000 includes a one-shot AF suitable for picking up a stationary subject and a servo AF (continuous AF) suitable for picking up a moving subject, as AF modes. In the one-shot AF, automatic focus detection is performed in a focus detection region selected by the user as appropriate. Then, the focus lens is moved to the focal position and the driving of the focus lens is stopped.

On the other hand, in the servo AF, the movement of the main subject is detected even after the focus lens is moved to the focal position. When the movement of the main subject is detected, the focus lens is continuously driven according to the amount of defocus detected in the focus detection region.

One-shot AF and servo AF can be selected by the user. Further, the one-shot AF is referred to as a first automatic focus detection operation, and the servo AF is referred to as a second automatic focus detection operation.

The shutter button 103 is mainly used when performing shooting with the camera 1000 in the normal position posture, and the shutter button 105 is mainly used when performing shooting with the camera 1000 in the upright position posture.

FIG. 1A is explained in other words as follows. In FIG. 1A, the camera body 100 includes a first grip portion 101 projecting forward. The user can operate the shutter button 103 while gripping the first grip portion 101 with the right hand and holding the camera system 1000 in the normal posture. Further, the camera body 100 includes a second grip portion 102 projecting forward. The user can operate the shutter button 105 while gripping the second grip portion 102 with the right hand and holding the camera system 1000 in the upright posture.

When the shutter buttons 103 and 105 are pressed halfway (first stroke), image pickup preparation operations such as the AF (autofocus) process, the AE (automatic exposure) process, the AWB (auto white balance) process, and the EF (flash pre-flash) process are performed. When the shutter buttons 103 and 105 are fully pressed (second stroke), a series of image pickup operations including the recording image pickup and the recording of picked-up images (image data) are performed.

In FIG. 1B, a power switch 43 is used to turn on or off the power of the camera 1000. A viewfinder 16 (also referred to as a viewfinder eyepiece 16) is a so-called peeping-type viewfinder used for checking the focus and composition of an optical image incident through the lens unit 150. Then, the viewfinder 16 allows the user to observe the information displayed on a viewfinder in-field display unit 41 (also referred to as an in-viewfinder display unit 41) described later together with the optical image.

A display unit 28 (also referred to as the rear face monitor 28) displays an image and various pieces of information obtained by shooting. A touch panel 72 (also referred to as a touch panel sensor 72) capable of receiving a touch operation (touch detection) is provided on the display face of the display unit 28. The touch panel 72 may be provided so as to be superimposed on the display unit 28, or may be provided integrally with the display unit 28.

The AF (autofocus) process is started by pressing the AF-ON buttons 80*a*, 80*b*, 80*c*, and 80*d*. Also, when the AF-ON buttons 80*a*, 80*b*, 80*c*, and 80*d* are released, the AF process stops. The AF-ON buttons 80*a* and 80*b* are included in the switch unit 70 described later, and the AF-ON buttons 80*c* and 80*d* are included in the switch unit 71 (FIG. 5A).

Optical tracking pointers (an example of a light input device, hereinafter referred to as an "OTP") 1, 2, 3, 4, 5, and 6 are touch operation members that optically detect the movement of patterns such as a fingerprint of a finger. The OTPs 1 to 6 detect a touch operation, detect an object that relatively moves in the two-dimensional direction (for example, a finger) to output movement information related to the movement of a finger and the like.

The OTPs 1 to 6 each has a light emitting unit and an optical position detection element (both not shown). The light emitting unit radiates light toward the finger placed on the surfaces of the AF-ON buttons 80*a* to 80*d* and the shutter buttons 103 and 105, from the inside of the buttons. Then, the reflected light from the pattern such as the fingerprint of the finger is measured by the optical position detection element. The optical position detection element can be realized by, for example, an image sensor.

In the present embodiment, as an example, a signal indicating the movement of the finger may be generated by image tracking of the direction of the finger movement and the amount of movement using the image process described in Japanese Laid-Open Patent Publication (Kokai) No. H11-345076 and the like.

By using the movement information of the relatively moving finger, which is the output of the OTPs 1 to 6, the position of a ranging point frame 405 (see FIG. 6A) displayed on the viewfinder in-field display unit 41 and the position of a ranging point frame 305 (see FIG. 6B) that can be displayed on the display unit 28 can be moved.

It should be noted that the display object that can be displayed on the viewfinder in-field display unit 41 or the display unit 28 and that can be moved is not limited to the ranging point frame. For example, the movement information from the OTPs 1 to 6 may be used to perform an operation of switching the image replayed to the next replay image. Further, it may be used to move the cursor for making a selection on the menu screen, switch setting values such as camera shutter speed, an ISO sensitivity, an aperture, and an exposure compensation, and the like. The above-mentioned OTPs 1 to 6 are respectively incorporated in the AF-ON buttons 80a to 80d and the shutter buttons 103 and 105.

The user who operates the camera 1000 performs a touch operation on the AF-ON buttons 80a to 80d and the shutter buttons 103 and 105 to slide the finger in the two-dimensional direction. As a result, the ranging point frame 405 displayed on the viewfinder in-field display unit 41 and the ranging point frame 305 that can be displayed on the display unit 28 can be moved. Further, by pressing the same button without releasing the finger or by releasing the pressing, the AF (autofocus) process can be turned on/off by any button.

For example, when the servo AF, which is the second automatic focus detection operation, is being performed by the shutter button 103 being pressed, the ranging point frame 405 can be operated while the servo AF is being performed, by OTP 1 built into the AF-ON button 80a being operated.

FIG. 1B is explained in other words as follows. In FIG. 1B, the power switch 43 is operated by the user to turn on/off the power of the camera system 1000. The viewfinder eyepiece 16 is a place that the user looks into when observing a subject image (optical image) formed by light incident from the interchangeable lens unit 150. Through the viewfinder eyepiece 16, the user can observe the subject image together with the information displayed on the in-viewfinder display unit 41 described later.

The rear face monitor 28 as a display unit is capable of displaying a picked-up image and various pieces of information. A touch panel sensor capable of detecting a touch operation is provided on the display face of the rear face monitor 28.

The AF-ON buttons 80a, 80b, 80c, and 80d each are provided to start the AF process according to the user operation. It is possible to cancel the AF process by canceling the operations on the AF-ON buttons 80a to 80d. The optical tracking pointers (OTP: optical input device) 1, 2, 3, 4, 5, and 6 are incorporated inside the AF-ON buttons 80a to 80d and the shutter buttons 103,105. Each of the OTPs 1 to 6 is a touch operation member that optically detects the movement of a pattern such as a fingerprint held by a contact object such as a user's finger to output an electrical signal. By using the electrical signals from the OTPs 1 to 6, it is possible to acquire information on the movement (movement direction and movement amount) of the contact object.

The arrangement of the shutter buttons 103 and 105 and the AF-ON buttons 80a to 80d with the OTPs 1 to 6 build-in is preferably configured as follows, so that the AF process can be started immediately while touch operation and slide operation being performed.

Figure 2A:
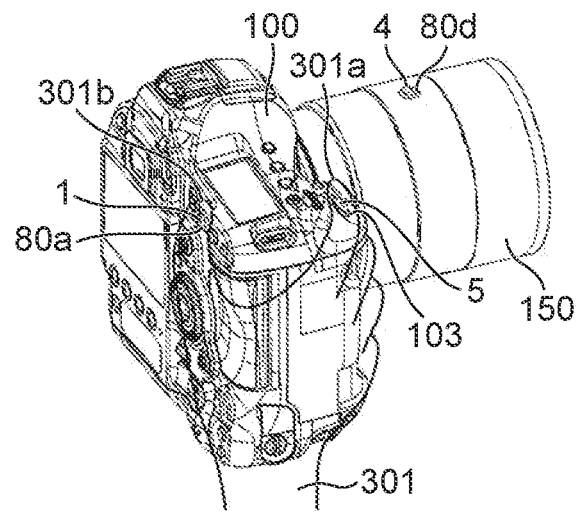
FIG. 2A is a diagram for explaining the arrangement of an operation unit operated by a user when performing shooting with the camera shown in FIGS. 1A and 1B. That is, it is a perspective view which shows the arrangement of AF-ON buttons and the shutter button provided in the camera system.
Figure 2B:
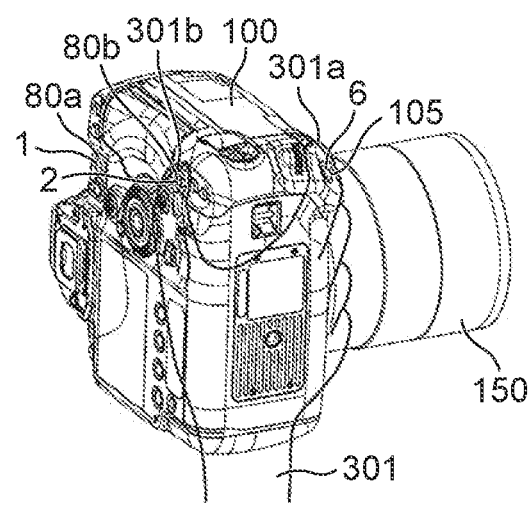
FIG. 2B is a diagram for explaining the arrangement of an operation unit operated by a user when performing shooting with the camera shown in FIGS. 1A and 1B. That is, it is a perspective view which shows the arrangement of the AF-ON buttons and the shutter button provided in the camera system.
Figure 2C:
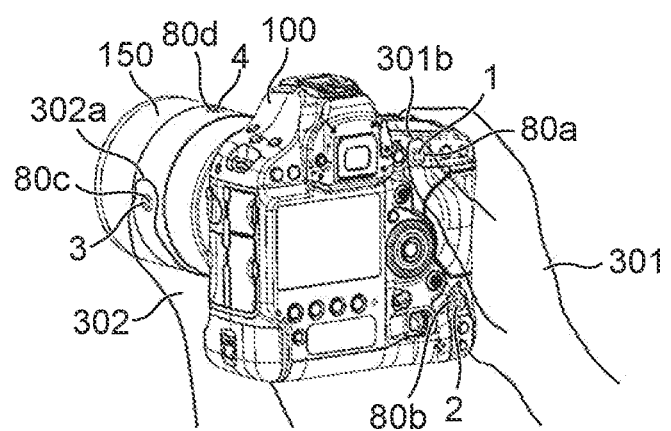
FIG. 2C is a diagram for explaining the arrangement of an operation unit operated by a user when performing shooting with the camera shown in FIGS. 1A and 1B. That is, it is a perspective view which shows the arrangement of the AF-ON buttons and the shutter button provided in the camera system.
Figure 2D:
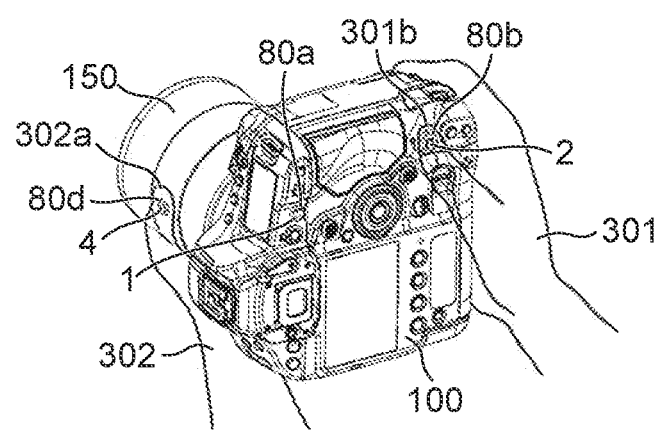
FIG. 2D is a diagram for explaining an arrangement of an operation unit operated by a user when performing shooting with the camera shown in FIGS. 1A and 1B. That is, it is a perspective view which shows the arrangement of the AF-ON buttons and the shutter button provided in the camera system.

FIGS. 2A to 2D are diagrams for explaining the arrangement of the operation unit operated by the user when performing shooting with the camera 1000 shown in FIGS. 1A and 1B. FIG. 2A is a perspective view showing one arrangement of the shutter button, and FIG. 2B is a perspective view showing the other arrangement of the shutter button. Further, FIG. 2C is a perspective view showing one arrangement of the AF-ON button, and FIG. 2D is a perspective view showing the other arrangement of the AF-ON button.

As shown in FIG. 2A, the shutter button 103 is disposed at a position at which it can be operated by an index finger 301a of the hand 301 holding the first grip portion 101 described above. That is, the shutter button 103 is disposed at a position where it overlaps with the protruding part of the first grip portion 101 when the camera 1000 is viewed from above.

Similarly, as shown in FIG. 2B, the shutter button 105 is disposed at a position at which it can be operated by the index finger 301a of the hand 301 holding the second grip portion 102. That is, the shutter button 105 is disposed at a position where it overlaps with the protruding part of the second grip portion 102 when the camera 1000 is viewed from the right in the rear face view.

Figure 3A:
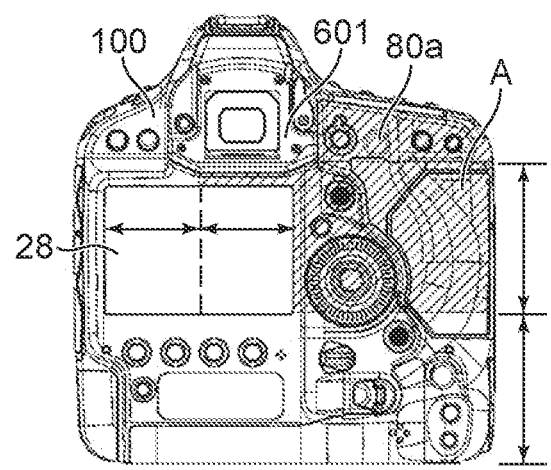
FIG. 3A is a diagram for explaining the arrangement of an operation unit provided in the camera shown in FIGS. 1A and 1B.
Figure 3B:
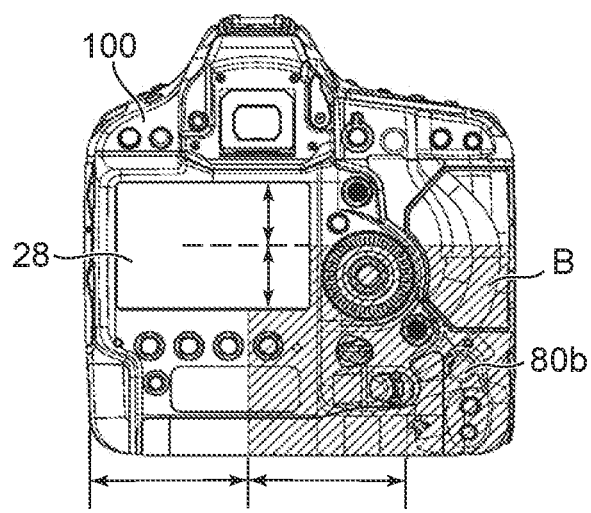
FIG. 3B is a diagram for explaining the arrangement of an operation unit provided in the camera shown in FIGS. 1A and 1B.
Figure 3C:
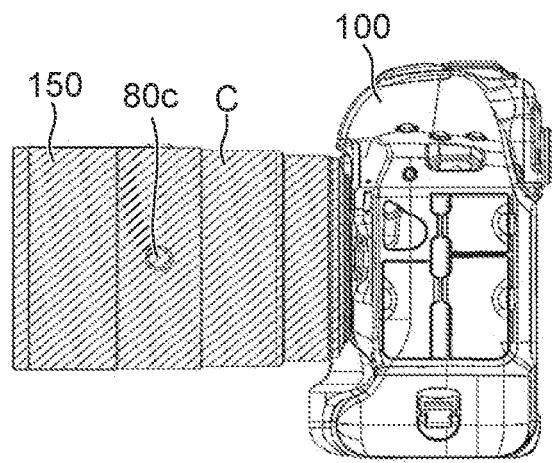
FIG. 3C is a diagram for explaining the arrangement of an operation unit provided in the camera shown in FIGS. 1A and 1B.
Figure 3D:
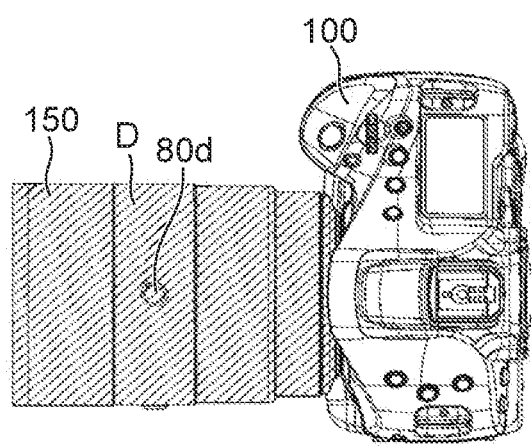
FIG. 3D is a diagram for explaining the arrangement of an operation unit provided in the camera shown in FIGS. 1A and 1B.

FIGS. 3A to 3D are diagrams for explaining the arrangement of the operation unit provided in the camera 1000 shown in FIGS. 1A and 1B. FIGS. 3A and 3B are views of the camera 1000 when viewed from the rear, and FIG. 3C is a view of the camera 1000 from the side. Further, FIG. 3D is a view of the camera 1000 from the upper face.

As shown in FIG. 2C, the AF-ON button 80a is disposed at a position at which it can be operated by a thumb 301b of the hand 301 holding the first grip portion 101. For example, as shown in FIG. 3A, the AF-ON button 80a is disposed above the substantially center of the length in upper-lower direction (vertical direction) of the first grip portion 101 when the camera 1000 in the normal position posture is viewed from the rear. Further, the AF-ON button 80a is preferably disposed in the diagonally shaded range A that is right of the center line of the display unit 28 in the left-right direction (horizontal direction) and that avoids a protrusion portion 601 (also referred to as the protrusion frame portion 601) of the viewfinder unit.

Also, considering mounting on the camera, the position where the AF-ON button 80a (OTP 1) is mounted is preferably set so that the lateral (horizontal) distance from the right end of the first grip portion 101 satisfies at least the following mathematical expression (1).

(Distance from the right end of the first grip portion 101 to the center in the left-right direction (horizontal direction) of the protrusion portion 601 which is the appearance of the viewfinder 16)≧(Distance from the right end of the first grip portion 101 to the center of the AF-ON button 80a (OTP 1) in the left-right direction (horizontal direction)) (1)

By satisfying the above mathematical expression, operability is improved because the photographer's eye and the finger with which the AF-ON button 80a (OTP 1) is operated do not interfere with each other when the photographer looking into the viewfinder 16.

Furthermore, in order for the photographer to keep firmly holding the first grip portion 101 until pressing the shutter button 103 after operating the AF-ON button 80a, it is preferable that the AF-ON button 80a be located at a position opposite to the shutter button 103 operated with the index finger with the housing interposed. Furthermore, in order to operate the shutter button 103 and AF-ON button 80a without lifting the belly of the hand from the first grip portion 101, it is preferable that at least the lateral (horizontal) distance from the right end of the first grip portion 101 satisfies the following mathematical expression (2).

(Distance from the right end of the first grip portion 101 to the center of the AF-ON button 80a (OTP 1) in the left-right direction (horizontal direction))≥(Distance from the right end of the first grip portion 101 to the center of the shutter button 103 in the left-right direction (horizontal direction)) (2)

In addition, considering mounting the button on an image pickup apparatus other than the camera, from the viewpoint of operability when operating the display object such as the ranging point frame 305 displayed on the display unit 28 with the AF-ON button 80a, the position where the AF-ON button 80a is mounted is preferably set so that the distance from the right end of the first grip portion 101 satisfies at least the following mathematical expression (3).

(Distance from the right end of the first grip portion 101 to the center of the display unit 28 in the left-right direction (horizontal direction))≥(Distance from the right end of the first grip portion 101 to the center of the AF-ON button 80a (OTP 1) in the left-right direction (horizontal direction)) (3)

By satisfying the above mathematical expression, it is possible to prevent the display unit 28 from being hidden by the finger of the user who operates the AF-ON button 80a.

As shown in FIG. 2D, the AF-ON button 80b is disposed at a position at which it can be operated by the thumb 301b of the hand 301 holding the second grip portion 102. For example, as shown in FIG. 3B, the AF-ON button 80b is disposed right of the substantially center of the lateral length of the second grip portion 102 when the camera 1000 in the normal position posture is viewed from the rear. Further, it is preferable that the AF-ON button 80b be disposed in the diagonally shaded range B below the vertical center line of the display unit 28.

The AF-ON button 80c is disposed at a position at which it can be operated by a thumb 302a of a hand 302, which is different from the hand 301 that holds the first grip portion 101. For example, as shown in FIG. 3C, it is preferable that the AF-ON button 80c be disposed in the range C that can be seen from the side face opposite to the first grip portion 101 when the camera in the normal position posture is viewed from the back.

The AF-ON button 80d is disposed at a position at which it can be operated by the thumb 302a of the hand 302, which is different from the hand 301 that holds the second grip portion 102. For example, as shown in FIG. 3D, it is preferable that the AF-ON button 80d be disposed in the range D that can be seen from the upper face opposite to the second grip portion 102.

Figure 3E:
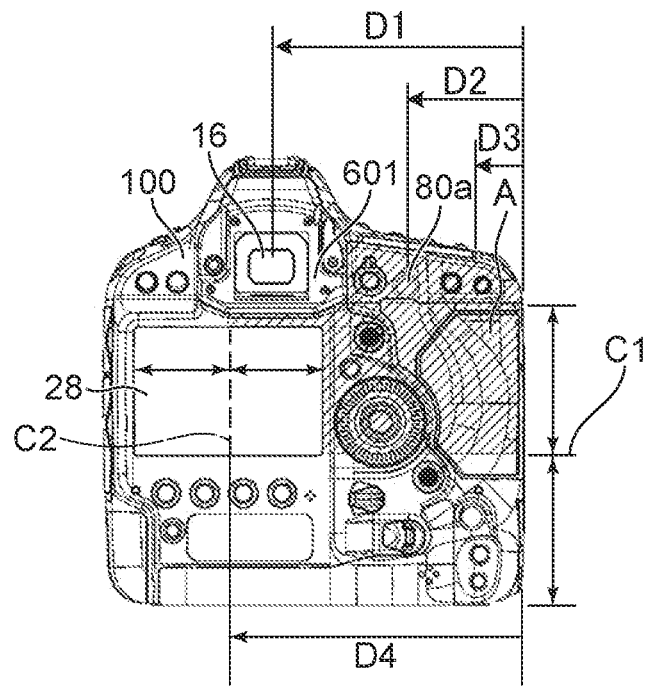
FIG. 3E is a rear view of the camera system.
Figure 3F:
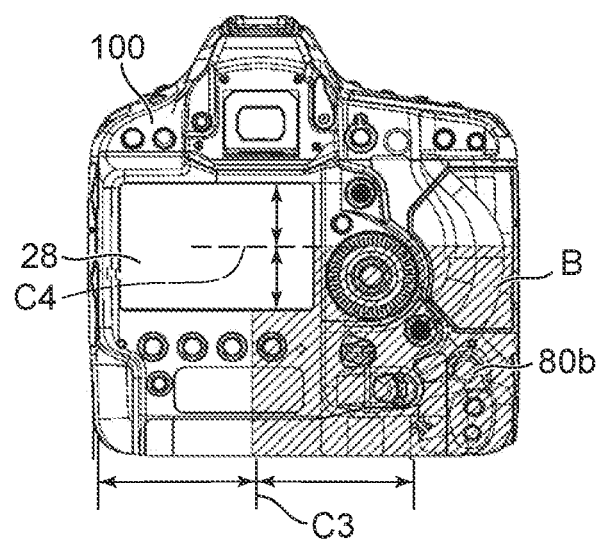
FIG. 3F is a rear view of the camera system.
Figure 3G:
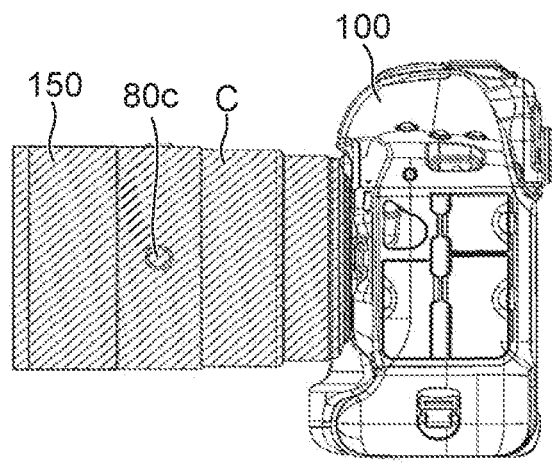
FIG. 3G is a side view of the camera system.
Figure 3H:
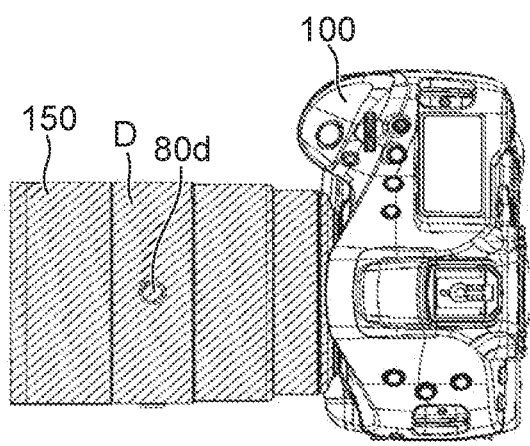
FIG. 3H is a top view of the camera system.

The arrangement of the AF-ON buttons 80a to 80d and the shutter buttons 103 and 105 is explained in other words as follows. It is preferable that the AF-ON buttons 80a to 80d and the shutter buttons 103 and 105, which incorporate the OTPs 1 to 6, be disposed as shown in FIGS. 2A to 2D and 3E to 3H so that the AF process can be started immediately while receiving touch operation or slide operation on them. FIGS. 2A and 2C are perspective views of the camera system 1000 in the normal posture when viewed from the rear and from diagonally above on the left side and the right side, respectively. FIGS. 2B and 2D are perspective views of the camera system 1000 in the upright posture when viewed from the rear and from diagonally above on the left side and right side, respectively. Further, FIGS. 3E and 3F show the camera body 100 in the normal posture when viewed from the rear, and FIGS. 3G and 3H show the camera system 1000 in the normal posture when viewed from the left face side and the upper face side, respectively. It should be noted that in FIGS. 3E to 3H, the same reference numbers are assigned to the same components as those shown in FIGS. 3A to 3D.

As shown in FIG. 2A, the shutter button 103 is disposed at a position at which it can be operated by the index finger 301a of the right hand 301 holding the first grip portion 101 of the camera body 100 in the normal posture. That is, the shutter button 103 is disposed at a position where it overlaps with the first grip portion 101 when the camera body 100 in the normal posture is viewed from above. Further, as shown in FIG. 2B, the shutter button 105 is disposed at a position at which it can be operated by the index finger 301a of the right hand 301 holding the second grip portion 102 of the camera body 100 in the upright posture. That is, the shutter button 105 is disposed at a position where it overlaps with the second grip portion 102 when the camera body 100 in the upright posture is viewed from the upper face (the right side in the normal posture).

As shown in FIG. 2C, the AF-ON button 80a is disposed at a position at which it can be operated by the thumb 301b of the right hand 301 holding the first grip portion 101 of the camera body 100 in the normal posture. More specifically, as shown in FIG. 3E, the AF-ON button 80a is disposed above the vertical center line C1 of the first grip portion 101 when the camera body 100 in the normal posture is viewed from the rear. Further, it is preferable that the AF-ON button 80a be disposed in the diagonally shaded range A which is right of the center line C2 of the rear face monitor 28 in the left-right direction and that avoids the protrusion frame portion 60 surrounding the viewfinder 16. Furthermore, it is preferable that the placement position of the AF-ON button 80a (OTP 1) in the left-right direction satisfy the condition:

$$D1 \geq D2,$$

where D1 is a distance in the left-right direction from the right end of the first grip portion 101 to the center of the protrusion frame portion 601 surrounding the viewfinder eyepiece 16, and D2 is a distance in the left-right direction from the right end of the first grip portion 101 to the center of the AF-ON button 80a. By satisfying this condition, when the user looks into the viewfinder eyepiece 16, the user's eye and the finger operating the AF-ON button 80a do not interfere with each other, so that the operability is improved.

In addition, in order for the user to keep firmly holding the first grip portion 101 until operating the shutter button 103 after operating the AF-ON button 80a, it is preferable that the AF-ON button 80a be located at a position opposite to the shutter button 103 operated with the index finger 301a with the housing interposed. Further, in order to operate the shutter button 103 and the AF-ON button 80a without lifting the belly of the hand from the first grip portion 101, it is preferable to satisfy the following condition. As described above, the distance in the left-right direction from the right end of the first grip portion 101 to the center of the AF-ON button 80a is put as D2, and the distance in the left-right direction from the right end of the first grip portion 101 to the center of the shutter button 103 is put as D3. At this time, it is preferable to satisfy the condition:

$$D2 \geq D3.$$

From the viewpoint of operability when operating the menu screen or the like displayed on the rear face monitor 28 with the AF-ON button 80a (OTP 1), it is preferable that the position of the AF-ON button 80a satisfy the following condition. As described above, the distance in the left-right direction from the right end of the first grip portion 101 to the center of the AF-ON button 80a is put as D2, and the distance in the left-right direction from the right end of the first grip portion 101 to the center of the rear face monitor 28 is put as D4. At this time, it is preferable to satisfy the condition:

$$D4 \geq D2.$$

By satisfying this condition, it is possible to prevent the rear face monitor 28 from being hidden by the finger operating the AF-ON button 80a.

As shown in FIG. 2D, the AF-ON button 80b is disposed at a position at which it can be operated by the thumb 301b of the right hand 301 holding the second grip portion 102 of the camera body 100 in the upright posture. More specifically, as shown in FIG. 3F, the AF-ON button 80b is disposed right of the center line C3 of the second grip portion 102 in the left-right direction when the camera body 100 in the normal posture is viewed from the rear. Further, it is preferable that the AF-ON button 80b be disposed in the diagonally shaded range B below the vertical center line C4 of the rear face monitor 28.

As shown in FIG. 2C, the AF-ON button 80c is disposed on the outer circumferential face (exterior face) of the interchangeable lens unit 150, at a position at which it can be operated by the thumb 302a of the left hand 302, which is different from the right hand 301 holding the first grip portion 101 of the camera body 100 in the normal posture. More specifically, as shown in FIG. 3G, it is preferable that the AF-ON button 80c be disposed in the diagonally shaded range C on the interchangeable lens unit 150 visible when the camera system 1000 in the normal posture is viewed from the left side opposite to the first grip portion 101. As shown in FIG. 2D, the AF-ON button 80d is disposed at a position, on the outer circumferential face of the interchangeable lens unit 150, at which it can be operated by the thumb 302a of the left hand 302, which is different from the right hand 301 that holds the second grip portion 102 of the camera body 100 in the upright posture. More specifically, as shown in FIG. 3H, it is preferable that the AF-ON button 80d be disposed in the diagonally shaded range D on the interchangeable lens unit 150 visible when the camera system 1000 in the upright posture is viewed from the upper face side opposite to the second grip portion 102.

Figure 4A:
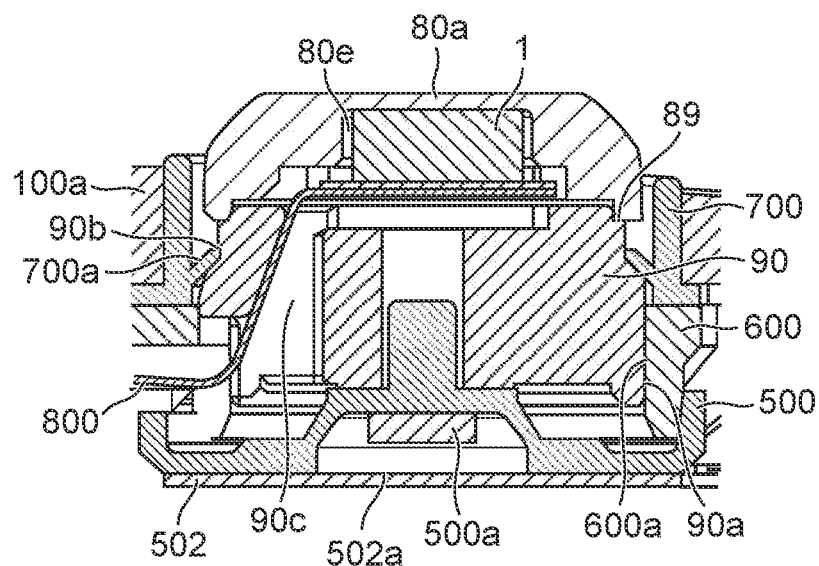
FIG. 4A is a cross-sectional view for explaining the AF-ON button provided in the camera shown in FIGS. 1A and 1B.
Figure 4B:
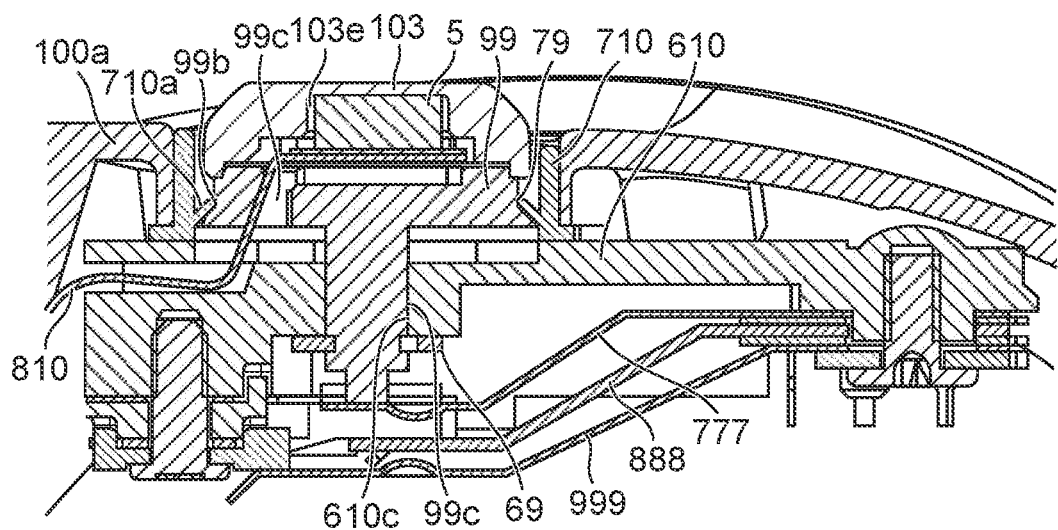
FIG. 4B is a cross-sectional view for explaining the shutter button provided in the camera shown in FIGS. 1A and 1B.

FIGS. 4A and 4B are cross-sectional views for explaining the AF-ON button and the shutter button provided in the camera 1000 shown in FIGS. 1A and 1B. FIG. 4A is a cross-sectional view of a substantially cylindrical AF-ON button, and FIG. 4B is a cross-sectional view of a substantially cylindrical shutter button.

First, the configuration in which the OTP 1 is incorporated into the AF-ON button 80a will be described with reference to FIG. 4A. It should be noted that the same applies to the configuration in which OTPs 2 to 4 are incorporated into the AF-ON buttons 80b to 80d, respectively.

The AF-ON buttons 80a to 80d can operate substantially perpendicular to the exterior face of the camera body 100 or the lens unit 150. In other words, the AF-ON buttons 80a to 80d are pushed in to be turned on. The AF-ON buttons 80a to 80d are switches made of, for example, conductive rubber (first conductive unit).

Figure 7A:
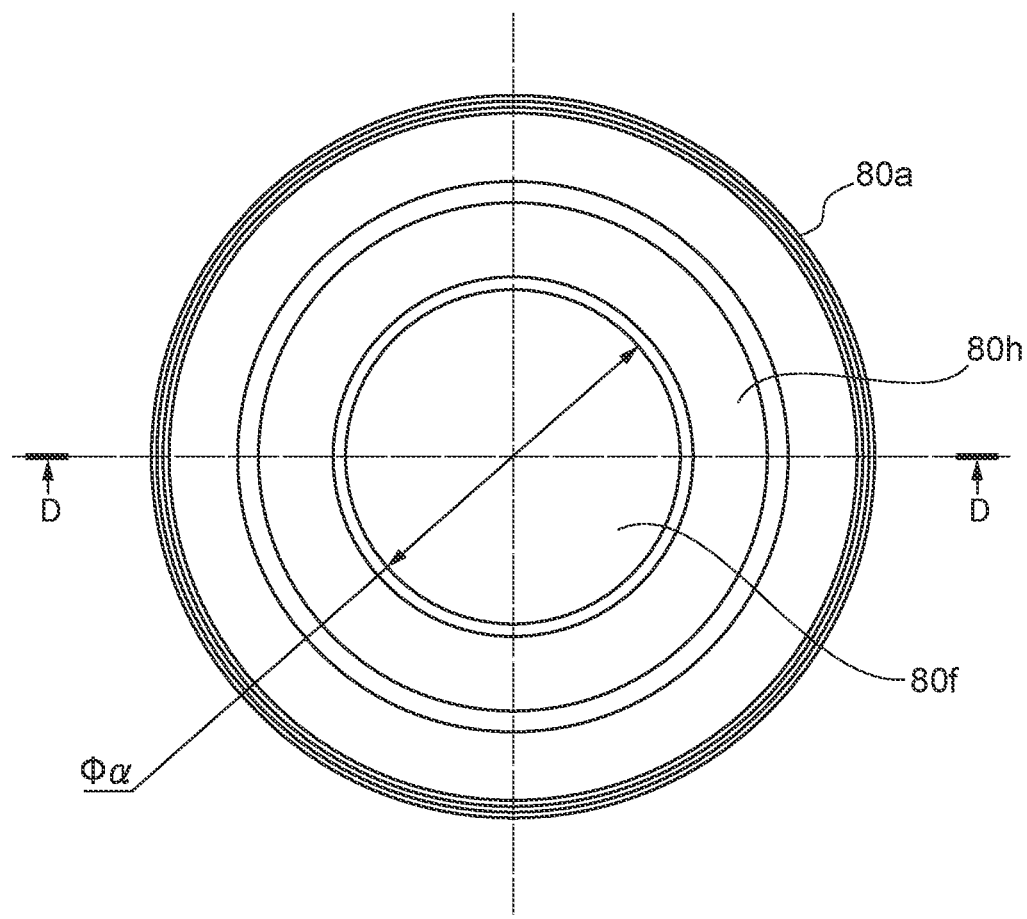
FIG. 7A is a diagram for explaining the shape of an operation member used in the camera shown in FIGS. 1A and 1B.
Figure 7B:
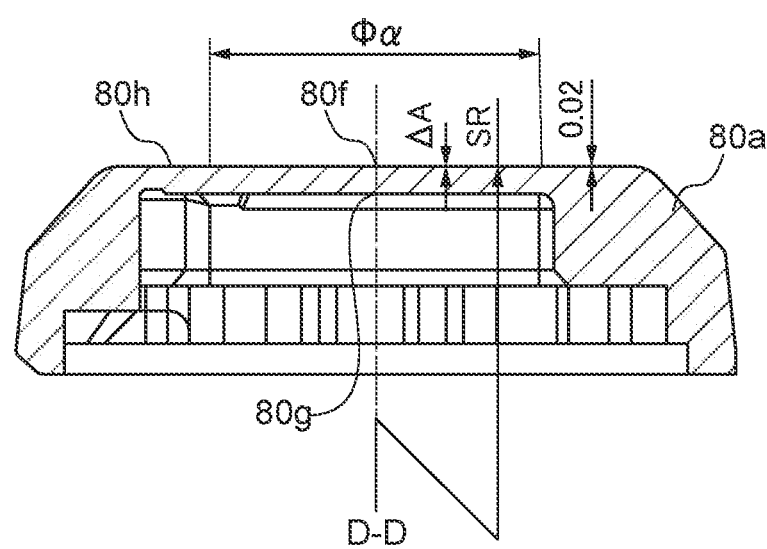
FIG. 7B is a diagram for explaining the shape of the operation member used in the camera shown in FIGS. 1A and 1B.

FIGS. 7A and 7B are diagrams for explaining the shape of the operation member used in the camera 1000 shown in FIGS. 1A and 1B. FIG. 7A is a top view (plan view), and FIG. 7B is a cross-sectional view shown by arrow D-D in FIG. 7A.

The OTP 1 is disposed in a recess 80e formed in the AF-ON button 80a. As shown in FIG. 7B, the AF-ON button 80a includes a transparent window composed of a thin mirror surface portions 80f and 80g. The OTP 1 radiates light from a light emitting unit (not shown) from the mirror surface portion 80g toward the mirror surface portion 80f, and detects reflected light of a fingerprint or the like placed on the mirror surface portion 80f by an optical position detection element (not shown).

The portion composed of the mirror surface portions 80f and 80g has a wall thickness which is sharply reduced compared to other portions, and hence is easily affected by heat shrinkage when the product comes out of the mold when the AF-ON button 80a being created by mold molding or the like. When the surface shape of the portion composed of the mirror surface portions 80f and 80g has an inflection point of unevenness, even if which is slight, due to heat shrinkage or the like, the inflection point is conspicuous due to reflection of external light or the like. Specifically, since the mirror surface portion 80f is an appearance surface, there is a possibility that the commercial value will be impaired when there is an inflection point. Therefore, in the present embodiment, the surface of the mirror surface portion 80f has a spherical shape with a radius SR that is gently convex in an outward direction so that inflection points due to heat shrinkage during molding do not occur.

Further, since when the mirror surface portion 80f formed as a convex hemispherical portion protrudes from the outer circumferential face 80h outside the mirror surface portion 80f, the mirror surface portion 80f is easily scratched, the distal end (protrusion end) of the mirror surface portion 80f is lower than the outer circumferential face 80h by ΔA. That is, the transparent window composed of the mirror surface portions 80f and 80g does not protrude from the outer circumferential face 80h. On the other hand, when ΔA is large, the finger may not come into contact with the mirror surface portion 80f, it is therefore preferable that ΔA be about 0.01 to 0.5 mm.

Further, in order to minimize the change in optical path length between the center and the outer circumference in the detection optical system of an optical detection element (not shown), it is preferable that the wall thickness difference between the center and the outer circumference at the mirror surface portion 80f be about 0.02 mm or less. Therefore, it is preferable that when the diameter of the mirror surface portion 80f is put as α and the radius of the spherical shape portion is put as SR, the radius SR (mm) of the spherical shape portion be a numerical value satisfying the following relational expression (4) with respect to the diameter α (mm) of the mirror surface portion 80f.

$$SR \geq 6.25\alpha^2 + 0.01 \qquad (4)$$

Further, considering the detection range of the finger, the diameter α, which is the mirror surface range, is preferably about 2 to 15 mm.

A button base 600 with a shaft hole 600a (also referred to as a hole 600a), and an underkey top 90 (also referred to as an under-operation member 90) having a fitting shaft 90a slidably fitted in the shaft hole 600a is disposed directly below the AF-ON button 80a. By adhering the AF-ON button 80a and the joint portion 89 of the underkey top 90 through the entire of circumference, the OTP 1 is coupled to the AF-ON button 80a and operates integrally. That is, the OTP 1 is disposed below (lower side) the surface, of the AF-ON button 80a which is one of the operation members, on which the finger is placed.

An elastic member 700 such as silicon rubber is sandwiched between an exterior cover (exterior member) 100a of the camera body 100 and the button base 600. This prevents water from entering through a space between the exterior cover 100a and the button base 600.

Further, a slope portion 90b formed on the underkey top 90 and an arm portion 700a (also referred to as a projection 700a) provided on the elastic member 700 come into contact with each other on the entire circumference. This prevents water from entering through a space between the AF-ON button 80a and the exterior cover 100a.

The OTP 1 is mounted on a flexible board 800. The flexible board 800 passes through a hole 90c formed in the underkey top 90, passes through the inner circumference of the arm portion 700a, and is connected to the board (not shown).

A switch rubber 500 having a conductive rubber (first conductive unit) 500a and a flexible printed board 502 are disposed below the underkey top 90. In the flexible printed board 502, a conductive pattern (second conductive unit) 502a is disposed under the conductive rubber 500a. When the AF-ON button 80a is pressed down, the conductive rubber 500a is pressed by the underkey top 90 adhered to the AF-ON button 80a and comes into contact with the conductive pattern 502a. As a result, the AF-ON button 80a is turned to an on state (electrical connection). The AF-ON buttons 80b to 80d have the same configuration as the AF-ON buttons 80a.

In the example above, a switch made of conductive rubber is used as the AF-ON buttons 80a to 80d, but it suffices to operate approximately vertically with respect to the camera 1000 and perform an on operation, for example, a tact switch including a reversing spring or the like may be used.

Subsequently, a configuration in which the OTPs 5 and 6 are incorporated into the shutter buttons 103 and 105 will be described with reference to FIG. 4B.

The shutter buttons 103 and 105 can operate substantially perpendicularly to the exterior face of the camera body 100. Then, when the shutter button 103 or 105 is pressed, the switch SW1 (indicated by reference numeral 7a in FIG. 5A) is turned on in the first stroke (half-pressed). As a result, the first shutter switch signal SW1 is generated.

Further, in the second stroke (fully pressed) of the shutter button 103 or 105, the switch SW2 (indicated by reference number 7b in FIG. 5A) is turned on to generate the second shutter switch signal SW2.

The OTP 5 is disposed in a recess 103e formed in the shutter button 103. A button base 610 with a shaft hole 610a, and an underkey top 99 (also referred to as an under-operation member 99) having a fitting shaft 99a slidably fitted in the shaft hole 610a, is disposed directly below the shutter button 103. By adhering the shutter button 103 and the joint portion 79 of the underkey top 99 through the entire of circumference, the OTP 5 is coupled to the shutter button 103 and moves integrally. The underkey top 99 is fixed to the button base 610 by a retaining member 69.

An elastic member 710 such as silicon rubber is sandwiched between the exterior cover 100a of the camera body 100 and the button base 610. This prevents water from entering through a space between the exterior cover 100a and the button base 610.

Further, a slope portion 99b formed on the underkey top 99 and an arm portion 710a (also referred to as a projection 710a) provided on the elastic member 710 come into contact with each other on the entire circumference. This prevents water from entering through a space between the shutter button 103 and the exterior cover 100a.

The OTP 5 is mounted on a flexible board 810. The flexible board 810 passes through a hole 99c formed in the underkey top 99, passes through the inner circumference of the arm portion 710a, and is connected to the board (not shown).

Conductive leaf switches 777, 888, and 999 are disposed under the underkey top 99. By pressing the shutter button 103, the leaf switch 777 and the leaf switch 888 come into contact with each other and become conductive. As a result, the first shutter switch signal SW1 is generated. By pressing the shutter button 103 deeper, the leaf switch 888 and the leaf switch 999 come into contact with each other and become conductive. As a result, the second shutter switch signal SW2 is generated.

Since the configuration of the shutter button 105 is the same as the configuration of the shutter button 103, the description thereof is omitted.

Figure 4C:
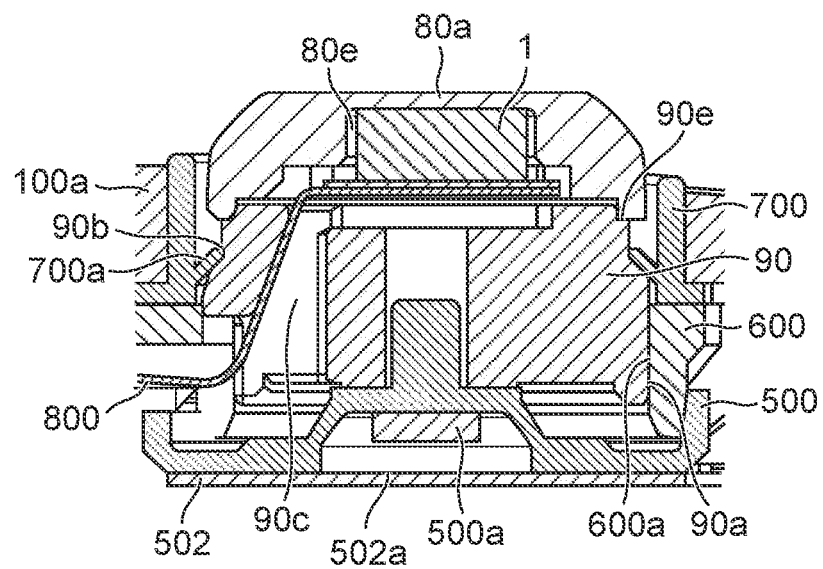
FIG. 4C is a cross-sectional view of the AF-ON button.

Another example of the AF-ON button and the shutter button will be described with reference to FIGS. 4C and 4D, FIGS. 7C and 7D, and FIG. 8. It should be noted that in FIG. 4C and FIG. 4D, FIG. 7C and FIG. 7D, the same reference numbers are assigned to the same components as those shown in FIGS. 4A and 4B, 7A and 7B. FIG. 4C shows the configuration of the AF-ON button 80a incorporating the OTP 1. The other AF-ON buttons 80b to 80d (OTPs 2 to 4) have the same configurations. The AF-ON button 80a is turned on by being pushed in a direction perpendicular to the exterior face of the camera body 100 or the lens unit 150.

Figure 7C:
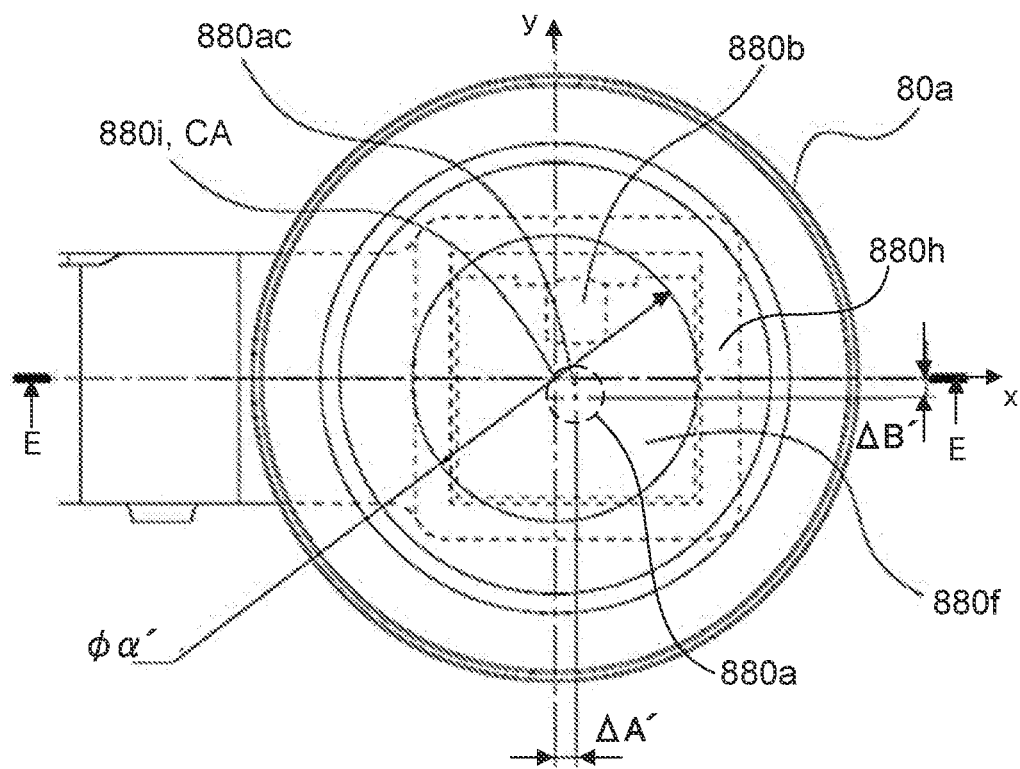
FIG. 7C is a top view showing the configuration of the AF-ON button and an optical tracking pointer.

The OTP 1 is disposed in the recess 80e formed inside the AF-ON button 80a. FIG. 7C shows the AF-ON button 80a and the OTP 1 as viewed from a direction perpendicular to the exterior face. The AF-ON button 80a is formed in a circular shape centered on the central axis CA extending in the direction perpendicular to the exterior face. The AF-ON button 80a has a circular detection face 880f and a button exterior face (peripheral portion) 880h formed in an annular shape adjacent to and surrounding the outer edge of the detection face 880f. The button exterior face 880h is also a part of the exterior face of the camera body 100 or the interchangeable lens unit 150. The detection face 880f is formed as a mirror surface so that the inside of the AF-ON button 80a cannot be seen from the outside.

Figure 7D:
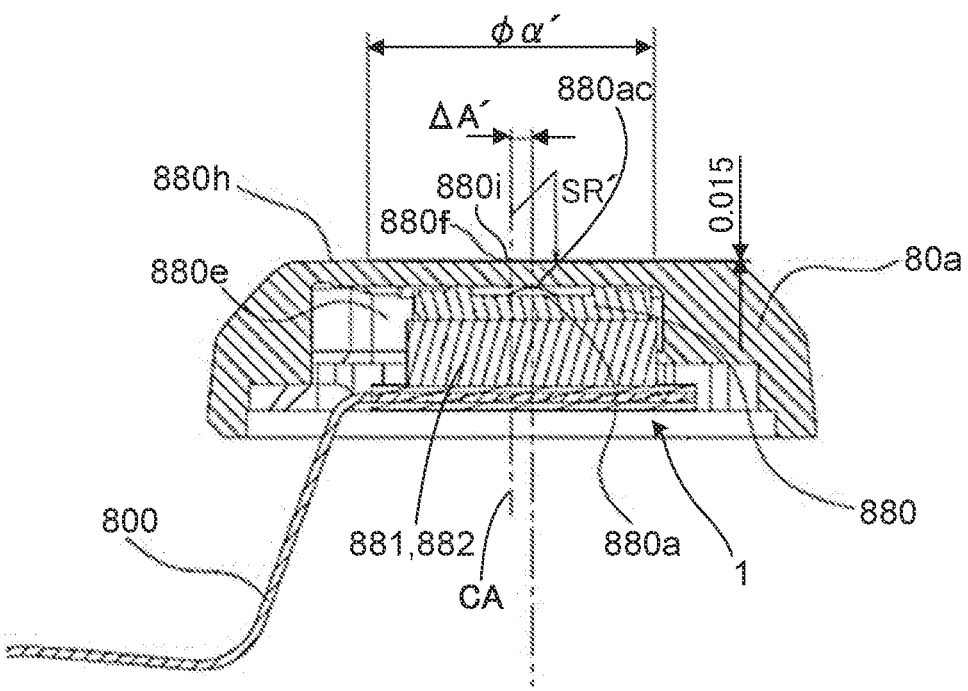
FIG. 7D is a cross-sectional view showing the configuration of the AF-ON button and the optical tracking pointer.

FIG. 7D shows a cross section of the AF-ON button 80a and the OTP 1 shown in FIG. 7C when they are cut along E-E line. As described later with reference to FIG. 8, the illumination light from a light source 881 passes through an illumination lens portion 880b of an optical member 880 and is transmitted from the inside to the outside of the detection face 880f to irradiate the finger in contact with the detection face 880f. Then, the reflected light from the finger (fingerprint) passes through a detection lens portion 880a of the optical member 880 and is imaged on a light receiving sensor 882.

Figure 8:
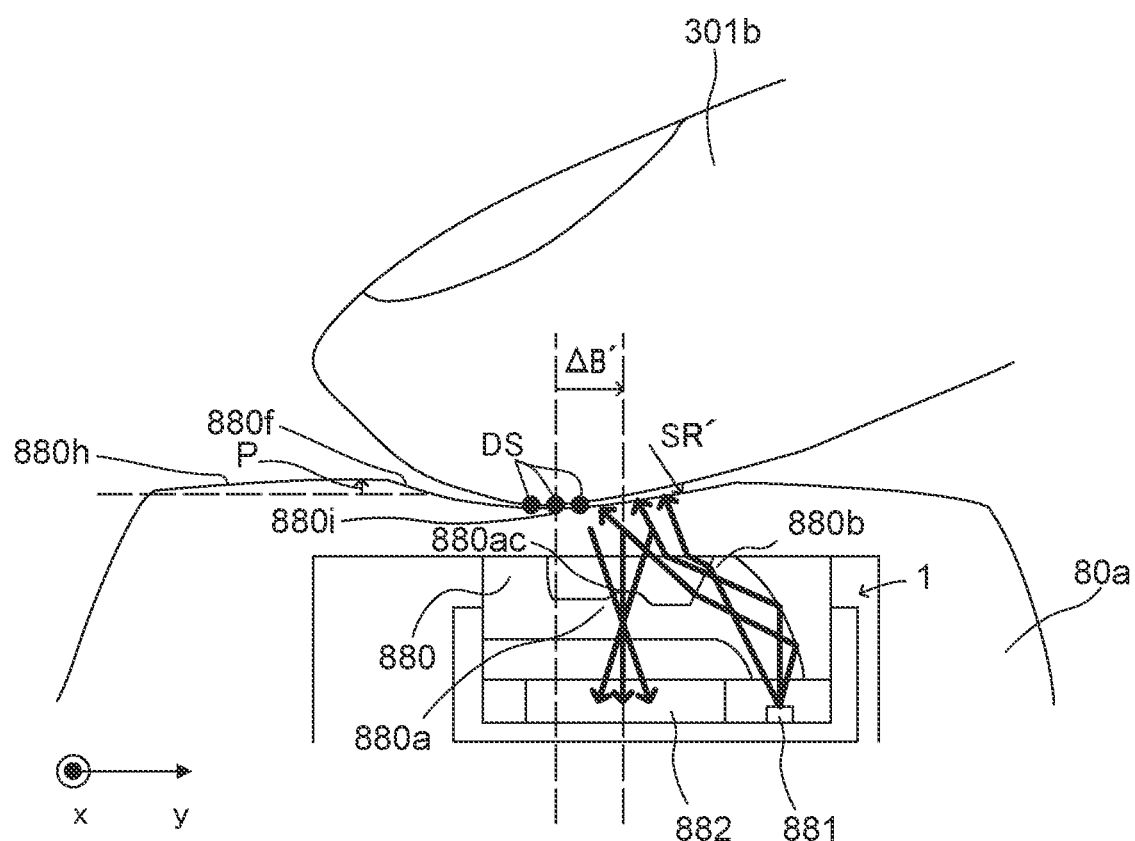
FIG. 8 is a diagram showing a schematic configuration of the optical tracking pointer.

FIG. 8 shows an example of the OTP 1 incorporated in the AF-ON button 80a. The OTP 1 has the detection face 880f formed as part of the AF-ON button 80a, the light source 881, the optical member 880, and the light receiving sensor 882. The optical member 880 has the illumination lens portion 880b and the detection lens portion 880a.

The light source 881 emits illumination light such as infrared light. The optical member 880 guides the illumination light from the light source 881 to the illumination lens portion 880b, and radiates the illumination light from the illumination lens portion 880b toward the detection face 880f. The reflected light transmitted through the detection face 880f and reflected by the fingerprint of the finger in contact with the detection face 880f is imaged on the light receiving face of the light receiving sensor 882 via the detection lens portion 880a as the imaging optical unit. The light receiving sensor 882 is composed of a photoelectric conversion element such as an image sensor, and performs photoelectric conversion of an optical image of a fingerprint formed on the light receiving face to generate an electrical signal. By using this electrical signal, it is possible to detect whether the finger touches the detection face 880f. The user can also instruct the start and stop of the AF process by touching or releasing the detection face 880f of the AF-ON buttons 80a to 80d.

When the user moves (slides) the finger on the detection face 880f in the two-dimensional direction, the electrical signal output from the light receiving sensor 882 also changes. A system control unit 50 can obtain information indicating the movement direction and the movement amount of the finger by performing an image process on the electrical signal. The system control unit 50, by using the obtained information on the movement direction and the movement amount of the finger, can move the AF frame displayed on the in-viewfinder display unit 41 or the rear face monitor 28 described above and the cursor on the menu screen, can change the shutter speed, the ISO sensitivity, the aperture, the exposure compensation value, and the like, and can switch the replay image. That is, the system control unit 50 controls the display on the in-viewfinder display unit 41 and the rear face monitor 28 by using the obtained information on the movement direction and the movement amount of the finger.

The AF frame is a rectangular or circular frame indicating a region to be focused by AF in the pickup screen. For the AF frame, for example, when the user moves the finger on the OTP built into the AF-ON button while performing the servo AF to keep the camera in focus on the moving subject, the AF frame can be moved according to the movement of the subject.

As shown in FIGS. 7D and 8, the detection face 880f has a concave curved face shape (concave spherical face shape) having a radius of curvature SR'. FIG. 8 exaggerates the concave spherical face shape of the detection face 880f, which is difficult to understand in FIG. 7D.

In the AF-ON button 80a, the detection face 880f has a thinner wall thickness than the other portions, and the detection face 880f is liable to have unevenness due to heat shrinkage immediately after molding the AF-ON button 80a. Such unevenness is conspicuous in appearance on the detection face 880f formed as a mirror surface. For this reason, in the embodiment, the detection face 880f has a gentle concave spherical face shape with a radius of curvature SR' from its outer edge (inner edge of the button exterior face 880h) so that unevenness due to heat shrinkage immediately after molding is less likely to occur. Further, since the detection face 880f has a concave spherical face shape, it is possible to prevent the detection face 880f from being scratched.

Further, it is preferable that, in order to minimize the difference in the optical path length between the center and the peripheral portion of the detection face 880f when the light reflected from the fingerprint is imaged on the light receiving sensor 882 by the detection lens portion 880a, the difference in wall thickness between the center and the peripheral part of the detection face 880f be 0.02 mm or less. Therefore, it is preferable that the radius of curvature SR' (mm) satisfy the condition:

$$SR' \geq 6.25\alpha'^2 + 0.01,$$

where α' is a diameter of the detection face 880f. The diameter α' of the detection face 880f suitable for fingerprint detection is preferably 2 to 15 mm.

Further, when the amount of recess of the detection face 880f is too large with respect to the button exterior face 880h, it is difficult for the finger to come into close contact with the detection face 880f, which may cause fingerprint detection failure. Therefore, it is preferable that the amount of recess of the detection face 880f with respect to the button exterior face 880h is 0.015 mm or less. In this case, it is preferable that the radius of curvature SR' (mm) satisfy the condition:

$$SR' \geq 8.33\alpha'^2 + 0.0075.$$

Also, as shown in FIGS. 7C, 7D and 8, in the embodiment, the center position (optical axis position) 880ac through which the optical axis passes in the circular detection lens portion 880a of the optical member 880 is disposed to deviate by ΔA' in the x direction and deviate by ΔB' in the y direction, from the most recessed center position 880i of the detection face 880f. The x direction and the y direction are directions orthogonal to the optical axis of the detection lens portion 880a.

When minute dust DS adheres to the detection face 880f formed in a concave spherical face shape as shown in FIG. 8, the dust DS tends to collect in the vicinity of the most recessed center position 880i of the detection face 880f. When the center position 880ac of the detection lens portion 880a of the optical member 880 matches the center position 880i of the detection face 880f, the fingerprint detection may be hindered by dust DS collected near the center position 880i. Therefore, in the embodiment, by shifting the center position 880ac of the detection lens portion 880a with respect to the center position 880i of the detection face 880f by ΔA' and ΔB' as described above, the dust DS collected in the vicinity of the center position 880i of the detection face 880f is not likely to affect the fingerprint detection.

It should be noted that in the embodiment, the center position 880ac of the detection lens portion 880a is shifted from the center position 880i of the detection face 880f However, the structure is not limited to this, and may be a structure in which the center position of the detection lens portion is shifted from the most recessed position of the detection face, that is, shifted from the position where dust is likely to collect, that is, such as a position farthest from the button exterior face.

Further, in the embodiment, the case where the detection face 880f is circular is described, but it may have other shapes such as a quadrangular shape. The center of the rectangular detection face may be the intersection of two diagonal lines, for example.

Further, in the embodiment, the button exterior face 880h is subjected to a satin finish to improve the sliding of the fingers. In addition, in order to make it easier for the user to intuitively understand the position of the detection face 880f that the finger contacts, as shown in FIG. 8 for clarity and exaggeration, it is preferable that the button exterior face 880h have a convex shape (convex slope shape) in which the amount of protrusion P to the outside gradually increases toward the inner edge (outer edge of the detection face 880f).

In FIG. 4C, the under-operation member 90 is disposed directly below the AF-ON button 80a. The fitting shaft 90a of the under-operation member 90 is fitted in the hole 600a formed in the button base 600 slidably in the vertical direction in the drawing. The entire circumference of the annular projection formed on the outer circumference of the lower portion of the AF-ON button 80a is adhered to a joint portion 90e of the under-operation member 90. As a result, the AF-ON button 80a, the under-operation member 90, and the OTP 1 sandwiched and held between them can be integrally moved in the vertical direction.

The cylindrical elastic member 700 such as silicon rubber is sandwiched between the exterior cover (exterior member) 100a of the camera body 100 and the button base 600. As a result, water and dust are prevented from entering the inside of the camera body 100 from between the exterior cover 100a and the button base 600. Further, the slope portion 90b formed in an annular shape on the outer circumference of the under-operation member 90 and the projection 700a provided in an annular shape on the inner circumference of the elastic member 700 come into contact with each other on the entire circumference. As a result, water and dust are prevented from entering the inside of the camera body 100 from between the AF-ON button 80a and the exterior cover 100a.

The OTP 1 is mounted on the flexible board 800, and the flexible board 800 is connected to a main board (not shown) in the camera body 100 through the hole 90c formed in the under-operation member 90.

The switch rubber 500 having the conductive rubber 500a and the flexible printed board 502 are disposed under the under-operation member 90. The switch rubber 500 holds the under-operation member 90, the OTP 1 and the AF-ON button 80a at the positions shown in the figure (off state) by its elastic force.

The conductive pattern 502a of the flexible printed board 502 is provided facing the conductive rubber 500a. When the user presses the AF-ON button 80a, the switch rubber 500 pressed by the under-operation member 90 elastically deforms and the conductive rubber 500a comes into contact with the conductive pattern 502a. As a result, the switch unit of the AF-ON button 80a composed of the conductive pattern 502a and the conductive rubber 500a is turned on.

It should be noted that in order to keep the AF-ON button 80a in the off state, a spring may be used instead of the switch rubber 500.

Figure 4D:
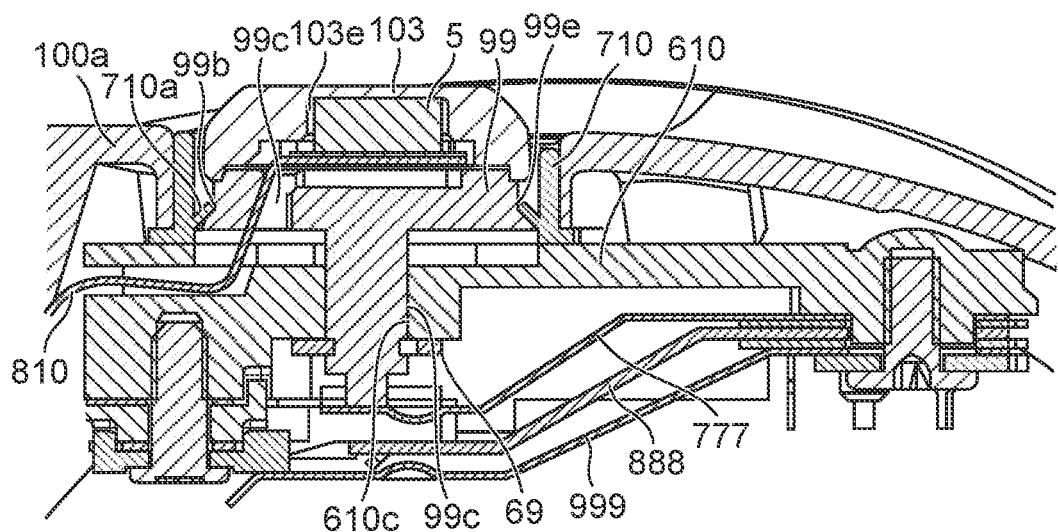
FIG. 4D is a cross-sectional view of the shutter button.

FIG. 4D shows the configuration of the shutter button 103 incorporating the OTP 5. The configuration of the other shutter button 105 (OTP6) is the same. The shutter button 103 is pushed by the user in the direction perpendicular to the exterior face of the camera body 100 by the first stroke to turn on the switch SW1 to generate the first shutter switch signal SW1. Further, the shutter button 103 turns on the switch SW2 by being pushed by the second stroke to generate the second shutter switch signal SW2.

The OTP 5 is disposed in the recess 103e formed inside the shutter button 103. The under-operation member 99 is disposed directly below the shutter button 103. The fitting shaft 99a of the under-operation member 99 is fitted in a hole 610c formed in the button base 610 slidably in the vertical direction in the drawing. The entire circumference of the annular projection formed on the outer circumference of the lower portion of the shutter button 103 is adhered to a joint portion 99e of the under-operation member 99. As a result, the shutter button 103, the under-operation member 99, and the OTP 5 sandwiched and held between them can be integrally moved in the vertical direction. The under-operation member 99 is prevented from coming off upward from the button base 610 by the retaining member 69 attached to the lower part of the shaft coming into contact with the lower face of the button base 610.

The cylindrical elastic member 710 such as silicon rubber is sandwiched between the exterior cover 100a of the camera body 100 and the button base 610. As a result, water and dust are prevented from entering the inside of the camera body 100 from between the exterior cover 100a and the button base 610. Further, the slope portion 99b formed in an annular shape on the outer circumference of the under-operation member 99 and the projection 710a provided in an annular shape on the inner circumference of the elastic member 710 come into contact with each other on the entire circumference. As a result, water and dust are prevented from entering the inside of the camera body 100 from between the shutter button 103 and the exterior cover 100a.

The OTP 5 is mounted on a flexible board 810. The flexible board 810 is connected to the main board in the camera body 100 through the hole 99c formed in the under-operation member 99.

The conductive leaf switches 777, 888, and 999 are disposed under the under-operation member 99. When the user presses the shutter button 103 by the first stroke, the switch SW1 composed of the leaf switch 777 and the leaf switch 888 conducts to generate a first shutter switch signal. When the shutter button 103 is pressed by the second stroke, the switch SW2 composed of the leaf switch 888 and the leaf switch 999 conducts to generate a second shutter switch signal.

FIG. 5A is a block diagram showing an example of the configuration of the camera 1000 shown in FIGS. 1A and 1B. It should be noted that in FIG. 5A, the same reference numbers are assigned to the same components as those shown in FIGS. 1A to 4B.

As described above, the lens unit 150 is detachable from the camera body 100. The lens unit 150 includes a taking lens 155 (also referred to as an image pickup lens 155). The taking lens 155 is composed of, for example, a plurality of lenses, but only one lens is shown here for the sake of simplicity.

A communication terminal 66 is a terminal for the lens unit 150 to communicate with the camera body 100, and a communication terminal 10 is a terminal for the camera body 100 to communicate with the lens unit 150. That is, the lens unit 150 communicates with the system control unit 50 of the camera body 100 via the communication terminals 66 and 10.

The lens unit 150 includes a lens control circuit 201, and the lens control circuit 201 drives and controls an aperture 204 by an aperture drive circuit 203. Further, the lens control circuit 201 uses an AF drive circuit 202 to displace the position of the taking lens 155 along an optical axis 900, and focus. Further, the OTPs 3 and 4 are connected to the lens control circuit 201.

The lens unit 150 is mounted on the camera body 100 via a mounting portion on which the lens unit 150 can be mounted. As the lens unit 150, various types such as a single focus lens or a zoom lens can be attached.

A photometric circuit 106 uses a photometric sensor (AE sensor) 17 to measure the luminance of the subject imaged on a focusing screen 13 via a quick return mirror 12. Then, the photometric circuit 106 sends the photometric result to the system control unit 50.

A focus detection unit (AF sensor) 11 is driven by a focus drive circuit 115 controlled by the system control unit 50. The focus detection unit 11 obtains the defocus amount by the phase-difference detection method according to the optical image incident through the quick return mirror 12, to output the defocus amount to the system control unit 50.

The system control unit 50 controls the lens unit 150 based on the defocus amount to perform the phase-difference AF. It should be noted that when performing the AF, it is not limited to the phase-difference AF, but, for example, the contrast AF may be used. Further, when performing the phase-difference AF, the phase-difference AF may be performed based on the amount of defocus detected on the image pickup face of the image pickup unit 22 without using the focus detection unit 11 (so-called image pickup face phase-difference AF).

The system control unit 50 controls a mirror drive circuit 114 to move the quick return mirror 12 up and down during exposure, live view shooting, and moving image shooting. The quick return mirror 12 is a mirror for sending an optical image incident through the taking lens 155 to either the viewfinder 16 or the image pickup unit 22.

The quick return mirror 12 is normally positioned at a position where it reflects an optical image and leads it to the viewfinder 16. That is, the quick return mirror 12 is normally located on the optical path (mirror down). On the other hand, when performing shooting or performing live view display, the quick return mirror 12 is positioned at a position where an optical image is guided to the image pickup unit 22. That is, the quick return mirror 12 is flipped up and retracted from the optical path (mirror lockup).

It should be noted that the quick return mirror 12 is a half mirror that allows part of the light to pass through the central portion thereof, and when the mirror is down, part of the light passes through the quick return mirror 12. Then, the transmitted light is reflected by a submirror 30 and enters the focus detection unit 11.

The user observes the optical image formed on the focusing screen 13 through a pentaprism 14 and the viewfinder 16. As a result, the user can confirm the focal state and composition of the subject image obtained through the lens unit 150.

The image pickup unit 22 is an image pickup device having a CCD or CMOS element that converts an optical image into an electrical signal, and the region that can pick up is substantially rectangular. A shutter 91 is disposed in front of the image pickup unit 22, and the system control unit 50 drives the shutter 91 by a shutter drive circuit 92.

The analog image signal output from the image pickup unit 22 is transmitted to an A/D conversion unit 23 via a clamp/CDS circuit 34 and an AGC 35. Then, the A/D conversion unit 23 converts the analog image signal into a digital image signal.

An image processing unit 24 performs a resizing process such as predetermined pixel interpolation and reduction and a color conversion process on the digital image signal from the A/D conversion unit 23 or the image data from the memory control unit 15. In addition, the image processing unit 24 performs a predetermined arithmetic process using the image data obtained by an image pickup. Then, the system control unit 50 performs exposure control and distance measurement control based on the arithmetic result. As a result, a TTL (through-the-lens) AF (autofocus) process, an AE (auto-exposure) process, and an EF (flash pre-flash) process are performed.

Further, the image processing unit 24 performs a predetermined arithmetic process using the image data obtained by an image pickup, and performs the TTL AWB (auto white balance) process based on the arithmetic result.

A memory 32 stores a digital image signal (image data) obtained by the image pickup unit 22 picking up and the A/D conversion unit 23 performing an A/D conversion, and stores display image data to be displayed on the display unit 28. The memory 32 has a sufficient storage capacity for storing a predetermined number of still images, and moving images and audio for a predetermined time.

It should be noted that the memory 32 may be a removable recording medium such as a memory card, or may be a built-in memory.

A buffer memory 37 is connected to the image processing unit 24, for temporarily recording image data. Further, the recording medium 200 is connected to a memory control unit 15 via an interface 40.

The display unit 28 is a rear face monitor for displaying an image, and is disposed on the rear face of the camera body 100 as shown in FIG. 1B. The image processing unit 24 displays the image data as an image on the display unit 28 via a D/A conversion unit 19 under the control of the system control unit 50. It should be noted that the display unit 28 is not limited to a liquid crystal display as long as it is a display that displays an image, and may be another display such as an organic EL.

A nonvolatile memory 56 is a memory that can be electrically erased and recorded by the system control unit 50, and for example, an EEPROM can be used as the nonvolatile memory 56. The nonvolatile memory 56 stores constants and programs for the operation of the system control unit 50. A time measurement circuit 109 measures the time required for the system control unit 50 to perform various control and transmit the measured time to the system control unit 50. A posture detection circuit 82 has, for example, a gyro sensor or the like, detects the posture of the camera 1000, and notifies the system control unit 50 of the result.

The system control unit 50 has at least one processor built therein and controls the entire camera 1000. As shown in the figure, the shutter buttons 103 and 105, the switch unit 70, and the power switch 43 are connected to the system control unit 50 via a switch sense circuit 93. In addition, the OTPs 1, 2, 5, and 6 are connected to the system control unit 50.

The system control unit 50 obtains, based on the output of the OTPs 1 to 6, the direction of movement due to slide operation (hereinafter referred to as a movement direction) in eight directions: up, down, left, right, upper left, lower left, upper right, and lower right. Further, the system control unit 50 obtains the amount of movement due to the slide operation in the two-dimensional directions of the x-axis direction and the y-axis direction (hereinafter referred to as a movement amount (x, y)) based on the outputs of the OTPs 1 to 6.

The system control unit 50 detects the following operation or state for the OTPs 1 to 6.

A finger newly touches each OTP 1 to 6. That is, the start of touch (hereinafter referred to as a "touch-down").

A state in which each OTP 1 to 6 is touched by the finger (hereinafter referred to as a "touch-on").

Moving the finger while touching each OTP 1 to 6 with the finger (hereinafter referred to as a "touch-move").

Releasing the finger that was touching each OTP 1 to 6. That is, the end of touch (hereinafter referred to as a "touch-up").

A state in which no OTPs 1 to 6 are not touched (hereinafter referred to as a "touch-off").

When a touch-down is detected, the touch-on is also detected. After the touch-down detection, the touch-on detection usually continues unless the touch-up is detected. The touch-move is detected when the touch-on is being detected. Even when the touch-on is detected, the touch-move is not detected when the movement amount (x, y) is 0. After it is detected that all the touching fingers have touched up, which is the touch-off.

The system control unit 50 determines what kind of operation (touch operation) has been performed on the OTPs 1 to 6 based on the above operation, state, movement direction, and movement amount (x, y). For the touch-moves, movements on the OTPs 1 to 6 are detected, the movements in eight directions of up, down, left, right, upper left, lower left, upper right, and lower right, or in two-dimensional directions of the x-axis direction and the y-axis direction.

When detecting a movement in any of the eight directions or a movement in one or both of the two-dimensional directions of the x-axis direction and the y-axis direction, the system control unit 50 determines that the slide operation has been performed. When there is an operation of releasing the touch within a predetermined time without touching and sliding the OTPs 1 to 6, the system control unit 50 determines that the tap operation has been performed.

It should be noted that in the shown example, the OTPs 1 to 6 are infrared touch sensors. However, the OTPs 1 to 6 may be a resistance film method, a surface acoustic wave method, a capacitance method, an electromagnetic induction method, an image recognition method, an optical sensor method, or another type of touch sensor.

For example, the system control unit 50 acquires the movement amount (x, y) detected by the OTP 1. After that, the system control unit 50 stores the movement amount (x, y) in a system memory 52. Further, the system control unit 50 acquires the moving direction detected by the OTP 1. After that, the system control unit 50 stores the moving direction in the system memory 52.

Based on the movement amount (x, y) and the movement direction stored in the system memory 52, the system control unit 50 obtains the position of the ranging point frame 305 or the ranging point frame 405, to which the ranging point frame 305a or the ranging point frame 405a to move. The system control unit 50 displays the position after the movement on the display unit 28 or displays it on the viewfinder in-field display unit 41 by an in-viewfinder liquid crystal drive circuit 111 (also referred to as an in-viewfinder display drive circuit 111).

As shown in the figure, the system control unit 50 displays various pieces of information related to the camera 1000 on a viewfinder out-of-field display device 9 by a liquid crystal display drive circuit 107.

The camera body 100 includes a power supply 42, and power is supplied from the power supply 42 to each part of the camera 1000. In the shown example, the power supply 42 includes an AC power supply (AC adapter) 42a and a secondary battery 42b.

Further, power is supplied from the power supply 42 to the system control unit 50 via a power supply circuit 110. The system control unit 50 checks the remaining amount of the secondary battery 42b by a battery check circuit 108.

Figure 5B:
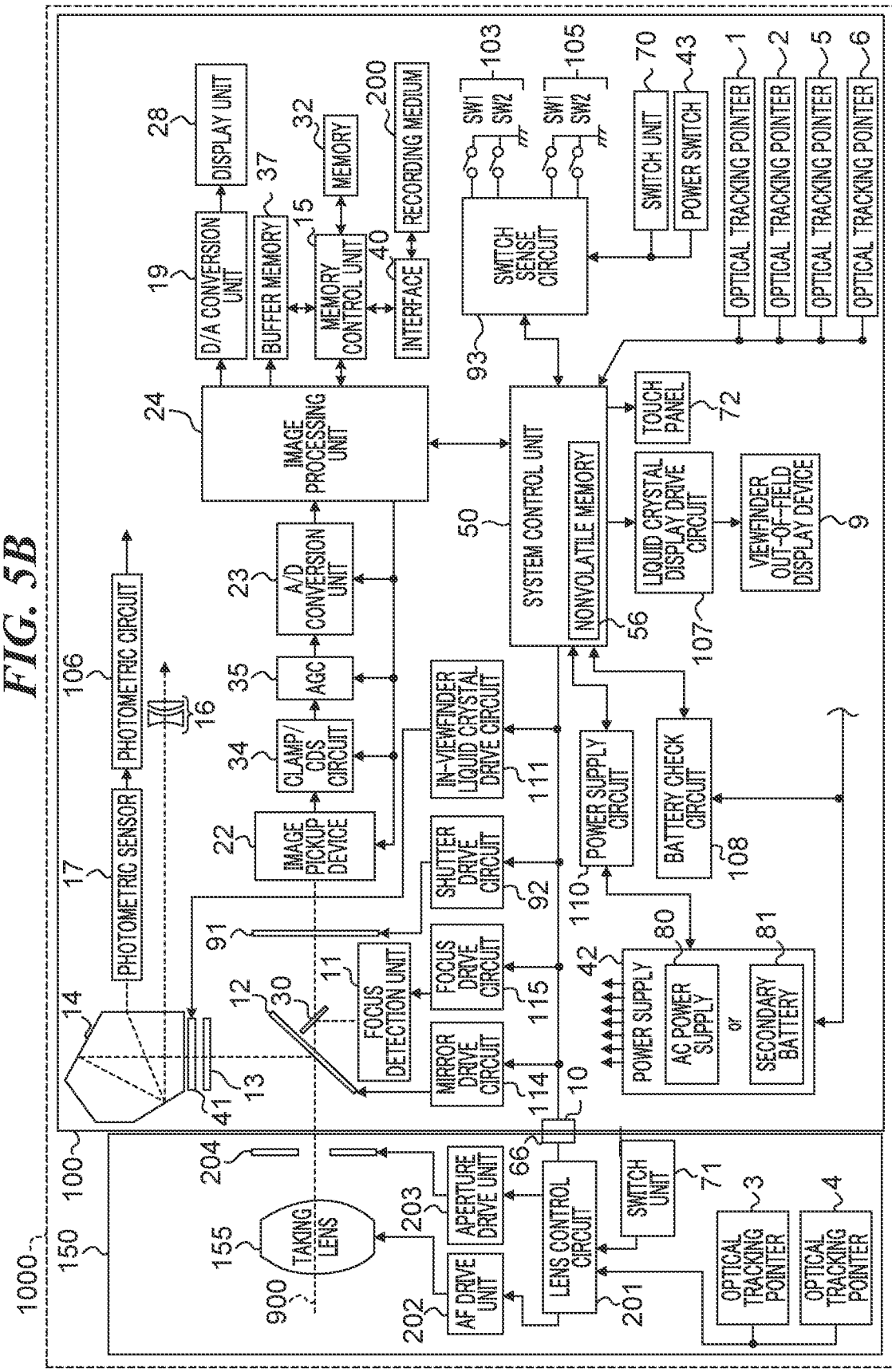
FIG. 5B is a block diagram showing an electrical configuration of the camera system.

FIG. 5B shows an example of the electrical configuration of the camera system 1000 (the camera body 100 and the interchangeable lens unit 150). It should be noted that in FIG. 5B, the same reference numbers are assigned to the same components as those shown in FIG. 5A. As described above, the interchangeable lens unit 150 provided with the image pickup lens 155 includes the lens control circuit 201 and the communication terminal 66 through which the lens control circuit 201 communicates with the camera body 100.

The lens control circuit 201 controls the drive of the aperture 204 via the aperture drive circuit 203, or moves a focus lens (not shown) included in the image pickup lens 155 along the optical axis 900 via the AF drive circuit 202. The above-mentioned switch unit 71 of the AF-ON buttons 80c and 80d, and the OTPs 3 and 4 are connected to the lens control circuit 201.

On the other hand, the camera body 100 includes the image pickup device 22, the photometric circuit 106, the focus detection unit 11, and the system control unit (control means) 50. The system control unit 50 is configured to communicate with the interchangeable lens unit 150 (lens control circuit 201) via the communication terminal 10.

The image pickup device 22 is composed of a CMOS sensor, and photoelectrically converts a subject image (optical image) formed by the image pickup lens 155 to output an analog pickup signal. The photometric circuit 106 measures, by a photometric sensor 17, the luminance of the subject imaged on the focusing screen 13 via the quick return mirror 12. The photometric circuit 106 sends the photometric result to the system control unit 50.

The focus detection unit 11 photoelectrically converts the subject image formed by the light incident from the image pickup lens 155 through the quick return mirror 12 in the mirror down state and the submirror 30 described later to generate a pair of subject image signals. The focus detection unit 11 calculates the defocus amount of the image pickup lens 155 by the phase-difference detection method using the pair of generated subject image signals. The focus detection unit 11 outputs the calculated defocus amount to the system control unit 50.

The system control unit 50 transmits the lens drive amount calculated based on the defocus amount to the lens control circuit 201. The lens control circuit 201 performs phase-difference AF by driving and controlling the focus lens via the AF drive circuit 202 according to the received lens drive amount. It should be noted that the image pickup face phase-difference AF may be performed using the image pickup device 22 instead of the focus detection unit 11. Alternatively, the contrast AF (TV-AF) may be performed.

The system control unit 50 controls the up/down drive of the quick return mirror 12 and the submirror 30 via the mirror drive circuit 114. In the mirror down state in which the quick return mirror 12 is disposed in the image pickup optical path as shown in the figure, the light incident from the image pickup lens 155 is reflected toward the focusing screen 13 to form a subject image on the focusing screen 13. As a result, the user can observe the subject image on the focusing screen 13 through the viewfinder eyepiece 16 and the pentaprism 14, and photometry by the photometric sensor 17 is possible.

The in-viewfinder display unit 41 as a display unit is provided in the optical viewfinder including the focusing screen 13, the pentaprism 14, and the viewfinder eyepiece 16. The in-viewfinder display unit 41 is driven by an in-viewfinder display drive circuit 111 controlled by the system control unit 50, to display various pieces of information such as the AF frame displayed overlaid on the subject image, and the shutter speed, the ISO sensitivity, the aperture and the exposure compensation value.

In the mirror lockup state in which the quick return mirror 12 is retracted out of the image pickup optical path, the light incident from the image pickup lens 155 and passing through the shutter 91 forms a subject image on the image pickup device 22. As a result, the image pickup device 22 can pick up (photoelectrically convert) the subject image, and the live view image pickup and the recording image pickup are performed. The shutter 91 is opened and closed by the shutter drive circuit 92 that received an instruction from the system control unit 50, and controls the exposure of the image pickup device 22.

The analog pickup signal output from the image pickup device 22 is transmitted to the A/D conversion unit 23 via the clamp/CDS circuit 34 and the AGC 35. The A/D conversion unit 23 converts the analog pickup signal into a digital pickup signal. The image processing unit 24 performs the pixel interpolation process, the resizing process, and the color conversion process on the digital pickup signal or the image data from the memory control unit 15. Further, the image processing unit 24 performs the arithmetic process for exposure control and focus detection control using the digital pickup signal. The system control unit 50 performs the AF process, the AE process, the AWB process, and the EF process, using the arithmetic results of the image processing unit 24.

The memory 32 stores the picked-up image data generated from the digital pickup signal and the display image data to be displayed on the rear face monitor 28. A buffer memory 37 is connected to the image processing unit 24, for temporarily recording image data. Further, the recording medium 200 is connected to the memory control unit 15 via the interface 40. The rear face monitor 28 is composed of a liquid crystal panel or an organic EL panel, and displays picked-up images, various pieces of information, and the AF frame, as described above. Further, as described above, the touch panel sensor 72 is provided on the display face of the rear face monitor 28.

The nonvolatile memory 56 stores constants and programs for the operation of the system control unit 50.

The switch unit 70 is connected to the system control unit 50 via the switch sense circuit 93. The switch unit 70 includes the switch unit of the AF-ON buttons 80*a* and 80*b* described above. Further, the power switch 43, the OTPs 1 to 4, and the switches SW1 and SW2 of the shutter buttons 103 and 105 are connected to the switch sense circuit 93.

The system control unit 50 detects the use's finger touch to the detection face 880*f* (hereinafter referred to as touch operation), and the finger movement on the detection face 880*f* (hereinafter referred to as slide operation) based on the respective outputs of the OTPs 1 to 6. Furthermore, the system control unit 50 detects the movement direction of the finger in the slide operation from among the eight directions of up, down, left, right, upper left, lower left, upper right and lower right, and detects the amount of movement (hereinafter referred to as the amount of movement (x, y)) of the finger in the two-dimensional directions (x direction and y direction) in the slide operation.

The system control unit 50 calculates the position of the AF frame after movement according to the detected slide operation direction and the movement amount (x, y). Then, the system control unit 50 displays the position of the AF frame after movement on at least one of the rear face monitor 28 and the in-viewfinder display unit 41. A display example of the AF frame will be described later.

The power supply 42 in the camera body 100 supplies power to each part of the camera body 1 and the interchangeable lens unit 150. The power supply 42 includes an AC power supply (AC adapter) 80 and a secondary battery 81. Further, the power supply 42 supplies power to the system control unit 50 via the power supply circuit 110. The system control unit 50 checks the remaining amount of the secondary battery 81 by the battery check circuit 108.

Figure 6A:
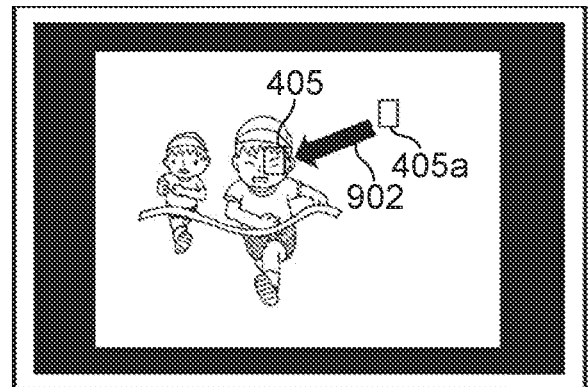
FIG. 6A is a diagram for explaining an example of performing shooting using the camera (camera system) shown in FIGS. 1A and 1B.
Figure 6A:
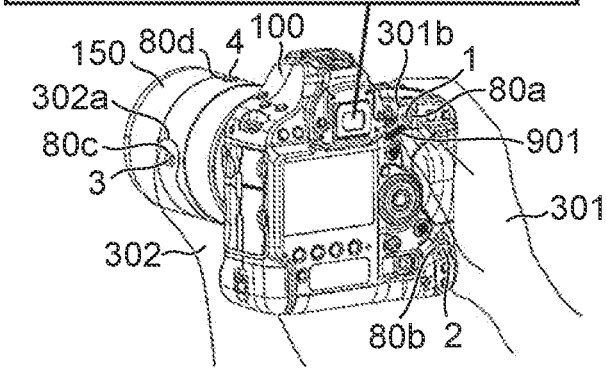
Figure 6B:
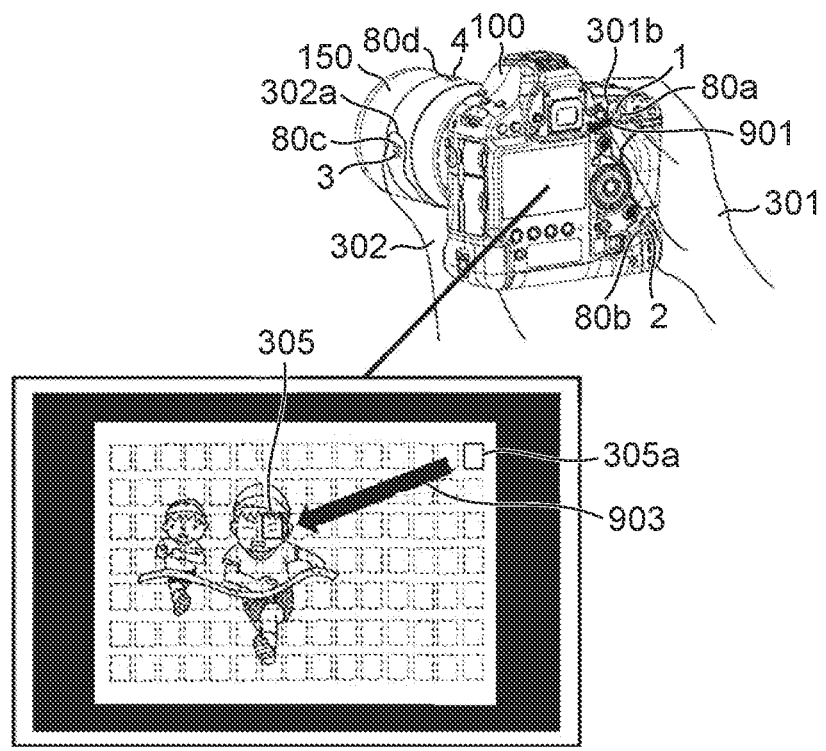
FIG. 6B is a diagram for explaining an example of performing shooting using the camera (camera system) shown in FIGS. 1A and 1B.

FIGS. 6A and 6B are diagrams for explaining an example of shooting with the camera 1000 shown in FIGS. 1A and 1B. FIG. 6A is a diagram showing an image displayed on the viewfinder during shooting, and FIG. 6B is a diagram showing an image displayed on the display unit 28 during shooting.

It is assumed that the user now grips the first grip portion 101 by the hand 301 and is operating the OTP 1 with the thumb 301*b*. In the figure, the arrow 901 indicates the direction of the touch-move of the OTP 1, due to the user sliding the thumb 301*b* to operate the OTP 1, detected by the system control unit 50.

In FIG. 6A, the ranging point frame 405*a* is a ranging point frame before movement displayed on the viewfinder in-field display unit 41. The ranging point frame 405 is a ranging point frame after movement.

The arrow 902 indicates the moving direction when the ranging point frame 405*a* is moved to the position of the ranging point frame 405 by the touch-move, and is the same direction as the arrow 901 indicating the direction of the touch-move in OTP 1.

In FIG. 6B, the ranging frame indicating the settable position of the ranging point frame 305 is shown by a broken line rectangle. In FIG. 6B, the ranging point frame 305*a* is a ranging point frame before movement displayed on the display unit 28. The ranging point frame 305 is a ranging point frame after movement.

The arrow 903 indicates the moving direction when the ranging point frame 305*a* is moved to the position of the ranging point frame 305 by the touch-move, and is the same direction as the arrow 901 indicating the direction of the touch-move in OTP 1.

Each of the OTPs 1 to 6 can be enabled or disabled regarding acception of touch and slide operations. In addition, each of the OTPs 1 to 6 can accept touch and slide operations even during AF operation.

As described above, in the embodiment of the present invention, the stroke in the push button is secured in order to avoid erroneous detection at the time of pushing. Then, the AF position can be easily selected and the AF can be easily started without moving the finger between the operation members.

It should be noted that although the selection of the AF position and the start of the AF have been described in the above example, the embodiment can be applied in which an operation related to an image pickup, a replay, and a setting in the camera is selected, and the start of the selected operation or the decision of the selection is instructed.

For example, a screen for selecting an operation related to an image pickup, a replay, and a setting is displayed on the display unit, and a cursor (display object) for selecting the image pickup, the replay, and the setting is displayed as well. Then, the cursor is moved according to the input amount through the selection member (pointing device), and the operation selected by the cursor is performed according to the operation of the operation member.

Further, as described above, the pointing device is disposed in the operation member. In addition, the image pickup includes the operation of focusing on the subject, the replay includes image feeding and image scaling, and the settings include at least settings of a shutter speed, an ISO sensitivity, an aperture, and an exposure compensation.

Shooting using the camera 1000 (camera system 1000) is explained in other words as follows. FIG. 6A shows an image displayed in the optical viewfinder, and FIG. 6B shows an image displayed on the rear face monitor 28. These figures show a case where the user holds the first grip portion 101 with the right hand 301 and is operating the OTP 1 with the thumb 301*b* of the right hand. The arrow 901 indicates that the user has performed a slide operation on the OTP 1. The system control unit 50 detects, based on the output from the OTP 1, the movement direction and the movement amount of the thumb 301*b* in this slide operation.

In FIG. 6A, the AF frame 405*a* displayed on the in-viewfinder display unit 41 is an AF frame before the slide operation, and this AF frame moves to the position of the AF frame 405, in the same direction (arrow 902) as the slide operation direction (arrow 901). Similarly, in FIG. 6B, the AF frame 305*a* displayed on the rear face monitor 28 is an AF frame before the slide operation, and this AF frame moves to the position of the AF frame 305, in the same direction (arrow 903) as the slide operation direction (arrow 901).

The system control unit 50 can switch whether to accept the touch operation and the slide operation on each OTP. The system control unit can also accept the touch operation and the slide operation on each OTP even during the AF process.

As explained above, in the camera system 1000 of the embodiment, the AF process can be started according to the touch operation on the OTP, and the AF frame can be moved according to the direction and amount of slide operation on the OTP. Therefore, the user can start the AF process or move the AF frame without moving the finger from the OTP.

In the embodiment, the description is made in which the AF process is started according to the touch operation on the OTP, and the AF frame is moved according to the slide operation on the OTP, but it is also possible to start another process and make selection and setting related to the process. For example, operations may be performed, in which a menu screen is displayed on the rear face monitor 28 in accordance with a touch operation on the OTP, the cursor is moved on the menu screen according to the slide operation on the OTP, and a menu item (a shutter speed, an ISO sensitivity, an aperture, an exposure compensation value, and the like) pointed by the cursor is changed or operations (an enlargement/reduction, fast-forwarding, and the like of the replay image) are performed in response to further touch operation.

It should be noted that the OTP may be incorporated into an operation member other than the button. The operation member is, for example, a touch panel, a joystick, a rotary dial, or the like.

Figure 9A:
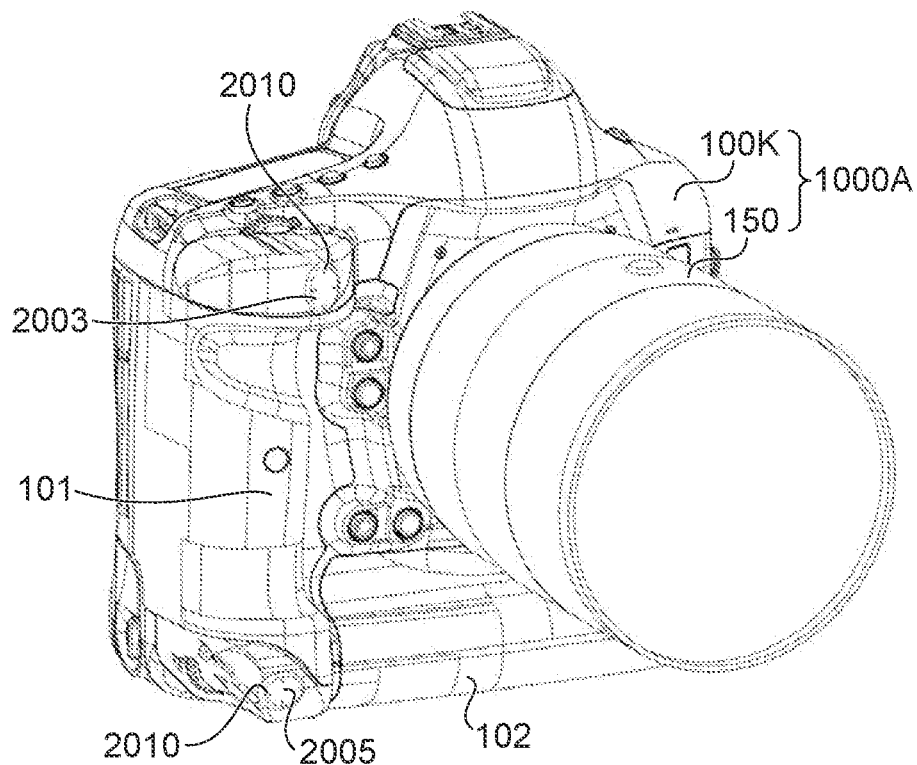
FIG. 9A is a perspective view showing another example of an image pickup apparatus according to an embodiment of the present invention.
Figure 9B:
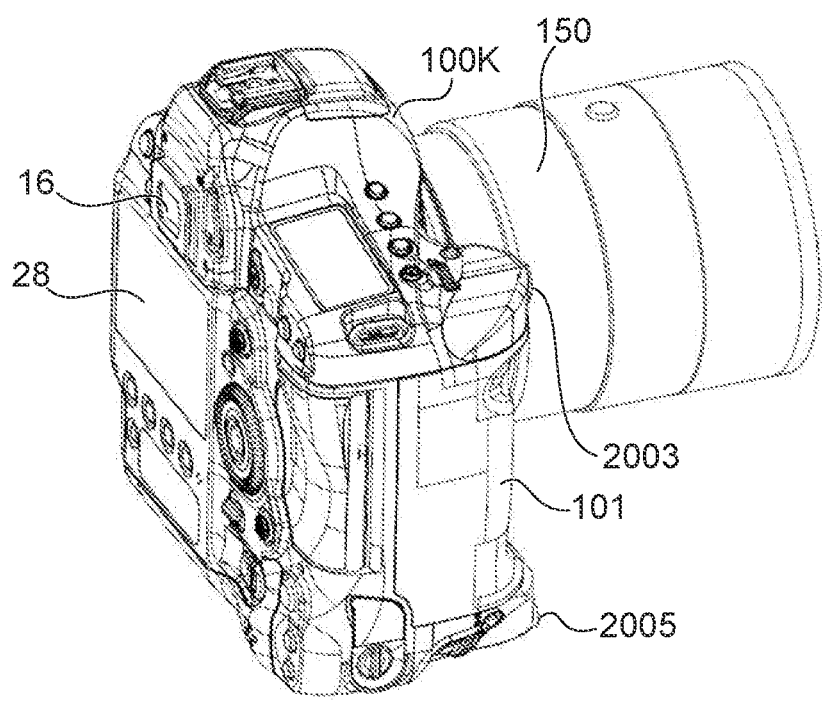
FIG. 9B is a perspective view showing the another example of the image pickup apparatus according to the embodiment of the present invention.

Next, an embodiment of the image pickup apparatus when the shutter buttons 103 and 105 are disposed and shaped differently in the camera 1000 will be described with reference to FIGS. 9A and 9B and FIGS. 10A to 10C. FIGS. 9A and 9B are perspective views showing the appearance of a camera 1000A, which is another example of the image pickup apparatus according to the embodiment of the present invention. FIG. 9A is a perspective view of the image pickup apparatus viewed from the front (front side), and FIG. 9B is a perspective view of it viewed from the side.

The camera 1000A includes a camera body 100K and the lens unit 150. The camera body 100K has shutter buttons 2003 and 2005. Since the function and the configuration of the shutter buttons 2003 and 2005 of the camera body 100K other than the shape and arrangement are the same as those of the camera 1000, the description thereof is omitted. The shutter buttons 2003 and 2005 of the camera body 100K correspond to the shutter buttons 103 and 105 of the camera 1000, respectively. The OTP 5 is built inside the shutter button 2003, and the OTP6 is built inside the shutter button 2005.

The shutter button 2003 is disposed within a range in which it can be operated by the index finger or the middle finger when the user grips the first grip portion 101. Further, the shutter button 2005 is disposed in a range in which it can be operated by the index finger or the middle finger when the user grips the second grip portion 102.

The shutter button 2003 is disposed on the front face (front side) and on the first grip portion 101 of the camera body 100K, so as to be substantially parallel to the viewfinder 16. The shutter button 2005 is disposed on the front face (front side) and on the second grip portion 102 of the camera body 100K, so as to be substantially parallel to the display unit 28. An index 2010 having a protrusion shape (protrusion portion) is disposed on the surface of each of the shutter buttons 2003 and 2005 so as to indicate at least one direction. Therefore, the user can easily recognize the vertical direction of the shutter buttons 2003 and 2005 by touching the index 2010. In addition, the user can instantly recognize the operation direction when operating the OTPs 5 or 6 while looking at the viewfinder 16 or the display unit 28. It should be noted that the vertical direction of the shutter button 2003 matches the vertical direction of the camera 1000A in the normal position posture. The vertical direction of the shutter button 2005 matches the vertical direction of the camera 1000A in the upright position posture.

Figure 10A:
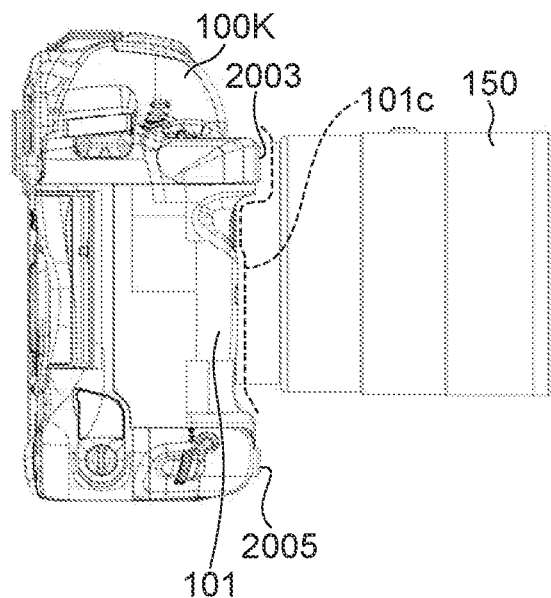
FIG. 10A is a diagram for explaining the appearance of the camera shown in FIGS. 9A and 9B.
Figure 10B:
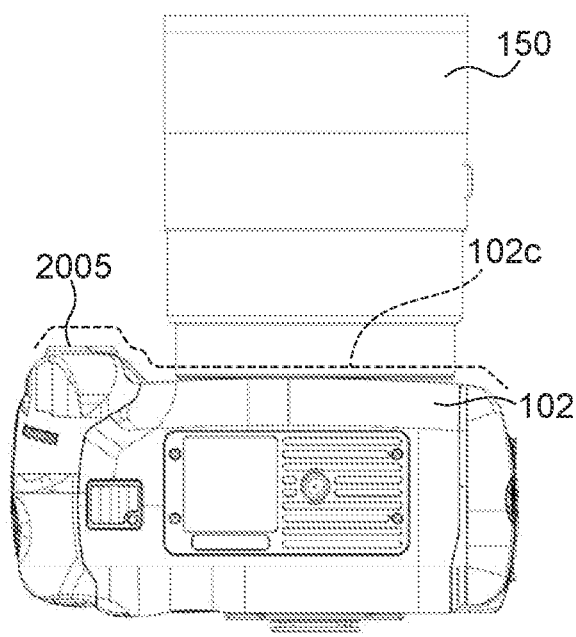
FIG. 10B is a diagram for explaining the appearance of the camera shown in FIGS. 9A and 9B.
Figure 10C:
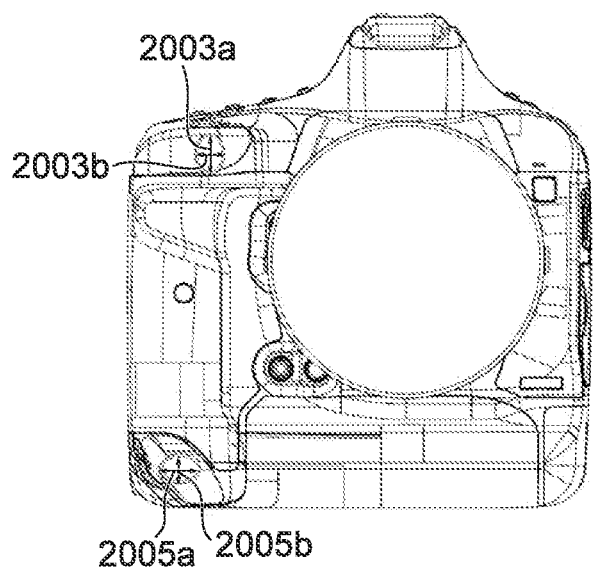
FIG. 10C is a diagram for explaining the appearance of the camera shown in FIGS. 9A and 9B.

FIGS. 10A to 10C are diagrams for explaining the appearance of the camera 1000A. FIG. 10A is a side view (a view of the camera 1000A as viewed from right side when viewed from the rear side), FIG. 10B is a bottom view, and FIG. 10C is a front view.

The shutter button 2003 is disposed at the most protruding position in a front range 101c including the first grip portion 101, of the camera 1000A, which is to be touched by the hand of the user. Similarly, the shutter button 2005 is disposed at the most protruding location in a front range 102c including the second grip portion 102, of the camera 1000A, which is to be touched by the hand of the user. As a result, there is no structural portion around the finger that interferes the finger when the user operates the button surface to move the ranging point, and thus the operability is improved.

Also, as shown in FIG. 10C, the shutter button 2003 has a substantially elliptical shape that is longer in the vertical direction 2003a than in the horizontal direction 2003b, and similarly, the shutter button 2005 has a substantially elliptical shape that is longer in the vertical direction 2005a than in the horizontal direction 2005b. As a result, it is possible to improve the operability of the OTP in the vertical direction 2003a, in which it is difficult to move the finger when the user grips the first grip portion 101 and operates the OTP with the camera 1000A facing the subject as shown in FIG. 2A and FIG. 2C. Similarly, it is possible to improve the operability of the OTP in the vertical direction 2005a, in which it is difficult to move the finger when the user grips the second grip portion 102 and operates the OTP with the camera 100A facing the subject as shown in FIG. 2B and FIG. 2D. It should be noted that although the shutter buttons 2003 and 2005 with an elliptical shape are shown, the shapes of the shutter buttons 2003 and 2005 are not limited to this. For example, various shapes having different aspect ratios such as rectangles, rhombuses, and ovals can be applied.

It should be noted that the control related to the OTPs 1 to 6 is not limited to the above-mentioned operation members, and can be applied to other operation members. For example, it can be applied to a touch panel, a joystick with which direction instructions are made by tilting an operation member, a rotary dial, and a physical button.

The present invention is also realized by executing the following process. That is, it is a process in which software (program) that realizes the functions of the above-described embodiments is supplied to the system or device via a network or various storage media, and the computer (or the CPU, the MPU, and the like) of the system or the device reads and executes the program code. In this case, the program and the storage medium storing the program constitute the present invention.

Other Embodiment

The present invention can also be realized by the process in which a program that realizes one or a plurality of functions of the above-described embodiments is supplied to the system or the device via the network or the storage medium, and one or a plurality of processors in the computer of the system or the device reads and executes the program. It can also be realized by a circuit (for example, an ASIC) that realizes one or a plurality of functions.

The present invention is not limited to the above embodiments, and various modifications and modifications can be made without departing from the spirit and scope of the present invention. Therefore, the following claims are attached to make the scope of the present invention public.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, the immediacy of cursor movement is not reduced, and autofocus is not started while the focus position is being selected. Further, according to the present invention, it is possible to realize an electronic device including an optical input device of which detection face is not easily scratched and is not easily affected by dust.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image pickup apparatus in which a position in a shooting screen at which autofocus is performed is selected, a start of the autofocus at the selected position is instructed, and picking up is performed, the image pickup apparatus comprising:
   an operation member configured to select a position in the shooting screen at which the autofocus is performed using a light input device that detects a slide movement of a finger, and instruct a start of the autofocus by an operation by the finger;
   a display unit configured to display a display object, for selecting a position in a shooting screen at which the autofocus is performed when the autofocus is performed; and
   a controller configured to move the display object according to an amount of movement of the finger detected by the light input device and start the autofocus at the position of the display object when the operation member is operated,
   wherein the light input device is disposed below a face, of the operation member, on which a finger is placed,
   wherein a transparent window is provided on a surface of the operation member, and the window has a portion convex in an outward direction of the operation member, and
   wherein when a diameter of the window is put as $\alpha$ (mm) and a radius of the convex portion is put as SR (mm), $SR \geq 6.25\alpha 2 + 0.01$ is satisfied.

2. An image pickup apparatus in which an operation related to an image pickup, a replay, and a setting is selected, and a start of the selected operation is instructed, the image pickup apparatus comprising:
   an operation member configured to select a position for performing an operation related to the image pickup, the replay, and the setting using a light input device that detects a slide movement of a finger, and instruct a start of the operation related to the image pickup, the replay, and the setting by the operation by the finger;
   a display unit configured to display a screen when making the selection; and
   a controller configured to display, on the screen, a display object for selecting the image pickup, the replay, and the setting, move the display object according to an amount of movement of the finger detected by the light input device, and execute the operation selected by the display object according to an operation on the operation member,
   wherein the light input device is disposed below a face, of the operation member, on which a finger is placed,
   wherein a transparent window is provided on a surface of the operation member, and the window has a portion convex in an outward direction of the operation member, and
   wherein when a diameter of the window is put as $\alpha$ (mm) and a radius of the convex portion is put as SR (mm) $SR \geq 6.25\alpha 2 + 0.01$ is satisfied.

3. An electronic device having an optical input device, wherein
   the optical input device comprising:
   a detection face;
   a light source configured to emit illumination light that is transmitted through the detection face, and illuminates a contact object in contact with the detection face;
   an optical member having an imaging optical unit that images reflected light, of the illumination light, reflected by the contact object to be transmitted through the detection face; and
   a light receiving sensor configured to photoelectrically convert an optical image of the contact object formed by the reflected light,
   wherein the detection face has a concave curved face shape that is recessed from a peripheral portion surrounding the detection face of an exterior face of the electronic device, and
   wherein an optical axis position of the imaging optical unit deviates from a center position or a most recessed position of the detection face, and
   wherein an amount of recess of the detection face from the peripheral portion is 0.015 mm or less.

4. The electronic device according to claim 3, wherein the peripheral portion has a convex shape in which an amount of protrusion to an outside increases toward an outer edge of the detection face.

5. An electronic device having an optical input device, wherein the optical input device comprising:

a detection face;

a light source configured to emit illumination light that is transmitted through the detection face, and illuminates a contact object in contact with the detection face;

an optical member having an imaging optical unit that images reflected light, of the illumination light, reflected by the contact object to be transmitted through the detection face; and a light receiving sensor configured to photoelectrically convert an optical image of the contact object formed by the reflected light, wherein the detection face has a concave curved face shape that is recessed from a peripheral portion surrounding the detection face of an exterior face of the electronic device, wherein an optical axis position of the imaging optical unit deviates from a center position or a most recessed position of the detection face, and wherein when a diameter of the detection face is put as $\alpha'$, a radius of curvature $SR'$ (mm) of the concave curved face shape satisfies a following condition:

$$SR' \geq 6.25\alpha'^2 + 0.01.$$

6. The electronic device according to claim 5, wherein the radius of curvature $SR'$ satisfies a following condition:

$$SR' \geq 8.33\alpha'^2 + 0.0075.$$

7. The electronic device according to claim 5, wherein the peripheral portion has a convex shape in which an amount of protrusion to an outside increases toward an outer edge of the detection face.

* * * * *